United States Patent
Muruganathan et al.

(10) Patent No.: US 12,494,874 B2
(45) Date of Patent: Dec. 9, 2025

(54) PUSCH MULTIPLE TRP RELIABILITY WITH UL TCI INDICATION

(71) Applicant: Telefonaktiebolaget LM Ericsson (publ), Stockholm (SE)

(72) Inventors: Siva Muruganathan, Stittsville (CA); Mattias Frenne, Uppsala (SE); Shiwei Gao, Nepean (CA); Helka-Liina Määttänen, Helsinki (FI); Jianwei Zhang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 567 days.

(21) Appl. No.: 17/915,772

(22) PCT Filed: Apr. 1, 2021

(86) PCT No.: PCT/IB2021/052757
§ 371 (c)(1),
(2) Date: Sep. 29, 2022

(87) PCT Pub. No.: WO2021/198988
PCT Pub. Date: Oct. 7, 2021

(65) Prior Publication Data
US 2023/0216626 A1 Jul. 6, 2023

Related U.S. Application Data

(60) Provisional application No. 63/003,720, filed on Apr. 1, 2020.

(51) Int. Cl.
*H04L 5/00* (2006.01)
*H04B 7/0456* (2017.01)
(Continued)

(52) U.S. Cl.
CPC ......... *H04L 5/0035* (2013.01); *H04B 7/0456* (2013.01); *H04L 1/22* (2013.01); *H04W 72/232* (2023.01)

(58) Field of Classification Search
CPC ....... H04L 5/0035; H04L 1/22; H04L 5/0053; H04L 1/08; H04B 7/0456; H04W 72/232
See application file for complete search history.

(56) References Cited

U.S. PATENT DOCUMENTS

2021/0184819 A1* 6/2021 Takeda ................. H04W 24/10
2021/0195583 A1* 6/2021 Venugopal ........ H04W 74/0833
(Continued)

FOREIGN PATENT DOCUMENTS

WO 2020044409 A1 3/2020

OTHER PUBLICATIONS

Author Unknown, "Technical Specification Group Radio Access Network; NR; Multiplexing and channel coding (Release 16)," Technical Specification 38.212, Version 16.0.0, Dec. 2019, 3GPP Organizational Partners, 145 pages.
(Continued)

*Primary Examiner* — Liem H. Nguyen
(74) *Attorney, Agent, or Firm* — Withrow & Terranova, PLLC

(57) ABSTRACT

Systems and methods to support Physical Uplink Shared Channel (PUSCH) multi-Transmission/Reception Point (TRP) scheduling are provided. In some embodiments, the wireless device performs one or more of: obtaining a configuration for Transmission Configuration Indicator (TCI) states for Uplink (UL) PUSCH scheduling; activating/deactivating a subset of configured TCI states). If two TCI states are indicated, the wireless device transmits two different PUSCHs each corresponding to one of the indicated TCI states. If one TCI state is indicated, the wireless device
(Continued)

transmits a single PUSCH corresponding to the indicated TCI state. The wireless device maps indicated TCI states to the transmission occasions or actual repetitions is preconfigured via higher layer parameter(s) or is given by a predefined rule. The wireless device applies a Transmitted Precoding Matrix Indicator (TPMI) to transmission occasions or actual repetitions associated with each indicated TCI state based on a signaled value and/or a predefined value.

12 Claims, 17 Drawing Sheets

(51) Int. Cl.
 *H04L 1/22* (2006.01)
 *H04W 72/232* (2023.01)

(56) References Cited

U.S. PATENT DOCUMENTS

| | | | | |
|---|---|---|---|---|
| 2021/0258964 A1* | 8/2021 | Khoshnevisan | ........ | H04B 7/022 |
| 2022/0131642 A1* | 4/2022 | Kim | ........................ | H04L 5/005 |
| 2022/0167279 A1* | 5/2022 | Zhou | ................... | H04W 52/146 |
| 2022/0295299 A1* | 9/2022 | Park | ....................... | H04W 72/23 |
| 2022/0322399 A1* | 10/2022 | Kim | ................... | H04W 72/1273 |
| 2022/0337456 A1* | 10/2022 | Kwak | ................. | H04L 25/0226 |
| 2022/0345272 A1* | 10/2022 | Guo | ....................... | H04W 72/20 |
| 2022/0376880 A1* | 11/2022 | Zhang | .................. | H04B 7/0695 |
| 2023/0019570 A1* | 1/2023 | Guo | ...................... | H04L 5/0051 |
| 2023/0072427 A1* | 3/2023 | Jung | ..................... | H04B 7/0617 |
| 2023/0073095 A1* | 3/2023 | Kim | .................. | H04W 72/1273 |
| 2024/0032082 A1* | 1/2024 | Xu | ......................... | H04W 72/53 |

OTHER PUBLICATIONS

Author Unknown, "Technical Specification Group Radio Access Network; NR; Physical layer procedures for control (Release 16)," Technical Specification 38.213, Version 16.0.0, Dec. 2019, 3GPP Organizational Partners, 146 pages.

Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.

Author Unknown, "Technical Specification Group Radio Access Network; NR; Radio Resource Control (RRC) protocol specification (Release 15)," Technical Specification 38.331, Version 15.8.0, Dec. 2019, 3GPP Organizational Partners, 532 pages.

Ericsson, "R1-1909225: Enhancements to multibeam operation," 3GPP TSG-RAN WG1 Meeting #98, Aug. 26-30, 2019, Prague, Czech Republic, 24 pages.

Fujitsu, "R1-1908323: Enhancements on multi-TRP transmission," 3GPP TSG RAN WG1 #98, Aug. 26-30, 2019, Prague, Czech Republic, 4 pages.

Oppo, "R1-1908352: Discussion on Multi-beam Operation Enhancements," 3GPP TSG RAN WG1 #98, Aug. 26-30, 2019, Prague, Czech Republic, 9 pages.

International Search Report and Written Opinion for International Patent Application No. PCT/IB2021/052757, mailed Jun. 7, 2021, 15 pages.

* cited by examiner

| F | BWP ID | Oct 1 |
|---|---|---|
| $C_0$ | SERVING CELL ID | Oct 2 |
| R | UL TCI STATE ID$_{0,1}$ | |
| | UL TCI STATE ID$_{0,2}$ | Oct 3 (OPTIONAL) |
| ... | ... | ... |
| $C_{N,1}$ | UL TCI STATE ID$_{N,1}$ | Oct M-1 |
| R | UL TCI STATE ID$_{N,2}$ | Oct M (OPTIONAL) |

*FIG. 7*

| | SERVING CELL ID | BWP ID | |
|---|---|---|---|
| F | | | OCT 1 |
| $C_0$ | TCI STATE ID$_{0,1}$ | | OCT 2 |
| R | TCI STATE ID$_{0,2}$ | | OCT 3 (OPTIONAL) |
| ⋮ | ⋮ | | ⋮ |
| $C_{N,1}$ | TCI STATE ID$_{N,1}$ | | OCT M-1 |
| R | TCI STATE ID$_{N,2}$ | | OCT M (OPTIONAL) |
| $D_0$ | TCI STATE ID$_{0,1}$ | | OCT M+1 |
| R | TCI STATE ID$_{0,2}$ | | OCT M+2 (OPTIONAL) |
| ⋮ | ⋮ | | ⋮ |
| $D_{P,1}$ | TCI STATE ID$_{P,1}$ | | OCT M'-1 |
| R | TCI STATE ID$_{P,2}$ | | OCT M' (OPTIONAL) |

ACTIVATED TCI STATES FOR DL PROVIDED IN OCTETS 2 TO M

ACTIVATED TCI STATES FOR UL PROVIDED IN OCTETS M+1 TO M'

FIG. 8

PUSCH MULTIPLE TRP RELIABILITY WITH UL TCI INDICATION

RELATED APPLICATIONS

This application is a 35 U.S.C. § 371 national phase filing of International Application No. PCT/IB2021/052757, filed Apr. 1, 2021, which claims the benefit of provisional patent application Ser. No. 63/003,720, filed Apr. 1, 2020, the disclosures of which are hereby incorporated herein by reference in their entireties.

TECHNICAL FIELD

The present disclosure relates to multiple Transmission/Reception Point (TRP) signaling reliability.

BACKGROUND

New Radio (NR) uses CP-OFDM (Cyclic Prefix Orthogonal Frequency Division Multiplexing) in both downlink (DL) (i.e., from a network node, gNB, or base station, to a user equipment or UE) and uplink (UL) (i.e., from UE to gNB). Discrete Fourier Transform (DFT) spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta f = 15$ kHz, there is only one slot per subframe, and each slot consists of 14 OFDM symbols.

Data scheduling in NR is typically in slot basis; an example is shown in FIG. 1 with a 14-symbol slot, where the first two symbols contain Physical Downlink Control Channels (PDCCHs) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by: $\Delta f = (15 \times 2^\mu)$ kHz where $\mu \in \{0, 1, 2, 3, 4\}$. $\Delta f = 15$ KHz is the basic subcarrier spacing. The slot durations at different subcarrier spacings is given by $1/2^\mu$ ms.

In the frequency domain, a system bandwidth is divided into resource blocks (RBs); each corresponds to 12 contiguous subcarriers. The RBs are numbered starting with 0 from one end of the system bandwidth. The basic NR physical time-frequency resource grid is illustrated in FIG. 2, where only one resource block (RB) within a 14-symbol slot is shown. One OFDM subcarrier during one OFDM symbol interval forms one resource element (RE).

In NR Rel-15, uplink data transmission can be dynamically scheduled using PDCCH. A UE first decodes uplink grants in PDCCH and then transmits data over PUSCH based the decoded control information in the uplink grant such as modulation order, coding rate, uplink resource allocation, etc.

In dynamic scheduling of PUSCH, there is also a possibility to configure semi-persistent transmission of PUSCH using configured grants (CG). There are two types of CG based PUSCH defined in NR Rel-15. In CG type 1, a periodicity of PUSCH transmission, as well as the time domain offset, is configured by Radio Resource Control (RRC). In CG type 2, a periodicity of PUSCH transmission is configured by RRC, and then the activation and release of such transmission is controlled by Downlink Control Information (DCI), i.e., with a PDCCH.

In NR, it is possible to schedule a PUSCH with time repetition, by the RRC parameter PUSCH-AggregationFactor (for dynamically scheduled PUSCH), and repK (for PUSCH with UL configured grant). In this case, the PUSCH is scheduled but transmitted in multiple adjacent slots (if the slot is available for UL) up until the number of repetitions as determined by the configured RRC parameter.

In the case of PUSCH with UL configured grant, the redundancy version (RV) sequence to be used is configured by the repK-RV field when repetitions are used. If repetitions are not used for PUSCH with UL configured grant, then the repK-RV field is absent.

In NR Release-15, there are two mapping types supported, Type A and Type B, applicable to PDSCH and PUSCH transmissions. Type A is usually referred to as slot-based while Type B transmissions may be referred to as non-slot-based or mini-slot-based.

Mini-slot transmissions can be dynamically scheduled and for NR Rel-15:

Can be of length 7, 4, or 2 symbols for downlink, while it can be of any length for uplink.

Can start and end in any symbol within a slot.

Note that mini-slot transmissions in NR Rel-15 may not cross the slot-border.

Spatial Relation Definition

Spatial relation is used in NR to refer to a relationship between a UL reference signal (RS) to be transmitted such as Physical Uplink Control Channel (PUCCH)/PUSCH DMRS (demodulation reference signal) and another previously transmitted or received RS, which can be either a DL RS (CSI-RS (channel state information RS) or SSB (synchronization signal block)) or a UL RS (SRS (sounding reference signal)). This is also defined from a UE perspective.

If a UL transmitted RS is spatially related to a DL RS, it means that the UE should transmit the UL RS in the opposite (reciprocal) direction from which it received the DL RS previously. More precisely, the UE should apply the "same" Transmit (Tx) spatial filtering configuration for the transmission of the UL RS as the Rx spatial filtering configuration it used to receive the spatially related DL RS previously. Here, the terminology 'spatial filtering configuration' may refer to the antenna weights that are applied at either the transmitter or the receiver for data/control transmission/reception. Another way to describe this is that the same "beam" should be used to transmit the signal from the UE as was used to receive the previous DL RS signal. The DL RS is also referred as the spatial filter reference signal.

On the other hand, if a first UL RS is spatially related to a second UL RS, then the UE should apply the same Tx spatial filtering configuration for the transmission for the first UL RS as the Tx spatial filtering configuration it used to transmit the second UL RS previously. In other words, the same beam is used to transmit the first and second UL RS respectively.

Since the UL RS is associated with a layer of PUSCH or PUCCH transmission, it is understood that the PUSCH/PUCCH is also transmitted with the same TX spatial filter as the associated UL RS.

Pusch Transmission Schemes

In NR, there are two transmission schemes specified for PUSCH.

Codebook Based PUSCH

The Codebook based UL transmission is used on both NR and Long Term Evolution (LTE) and was motivated to be used for non-calibrated UEs and/or UL FDD. Codebook based PUSCH in NR is enabled if higher layer parameter txConfig=codebook. For dynamically scheduled PUSCH and configured grant PUSCH type 2, the Codebook based PUSCH transmission scheme can be summarized as follows:

- the UE transmits one or two SRS resources (i.e., one or two SRS resources configured in the SRS resource set associated with the higher layer parameter usage of value 'CodeBook')
- the gNB determines a preferred Multiple Input Multiple Output (MIMO) transmit precoder for PUSCH (i.e., transmit precoding matrix indicator or TPMI) from a codebook and the associated number of layers corresponding to the one or two SRS resources.
- the gNB indicates a selected SRS resource via a 1-bit 'SRS resource indicator' field if two SRS resources are configured in the SRS resource set. The 'SRS resource indicator' field is not indicated in DCI if only one SRS resource is configured in the SRS resource set.
- The gNB indicates a TPMI and the associated number of layers corresponding to the indicated SRS resource (in case 2 SRS resources are used) or the configured SRS resource (in case of 1 SRS resource is used). TPMI and the number of PUSCH layers are indicated by the 'Precoding information and number of layers' field in DCI formats 0_1 and 0_2. The number of bits in the 'Precoding information and number of layers' for Codebook based PUSCH is determined as follows:

0 bits if 1 antenna port is used for PUSCH transmission.

4, 5, or 6 bits according to Table 1 for 4 antenna ports, according to whether the transform precoder is enabled or disabled, and the values of higher layer parameters maxRank, and codebookSubset. That is, 'Precoding information and number of layers' field size takes values of 6, 5, and 4 bits if codebookSubset is set to 'fullyAndPartialAndNonCoherent', 'PartialAndNonCoherent', and 'NonCoherent', respectively.

TABLE 1

Precoding information and number of layers, for 4 antenna ports, if transform precoder is disabled and maxRank = 2 or 3 or 4 (Reproduced from Table 7.3.1.1.2-2 of 3GPP TS 38.212)

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | ... | ... |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | ... | ... |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| ... | ... | | | | |
| 47 | 1 layers: TPMI = 27 | | | | |
| 48 | 2 layers: TPMI = 14 | | | | |
| ... | ... | | | | |
| 55 | 2 layers: TPMI = 21 | | | | |
| 56 | 3 layers: TPMI = 3 | | | | |
| ... | ... | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

2, 4, or 5 bits are given according to Table 2 for 4 antenna ports, according to whether transform precoder is enabled or disabled, and the values of higher layer parameters maxRank, and codebookSubset. That is, 'Precoding information and number of layers' field size takes values of 5, 4, and 2 bits if codebookSubset is set to 'fullyAndPartialAndNonCoherent', 'PartialAndNonCoherent', and 'NonCoherent', respectively.

Subset. That is, 'Precoding information and number of layers' field size takes on values of 3 and 1 bits if codebookSubset is set to 'fullyAndPartialAndNonCoherent' and 'NonCoherent', respectively.

TABLE 2

Precoding information and number of layers for 4 antenna ports, if transform precoder is enabled, or if transform precoder is disabled and maxRank = 1 (Reproduced from Table 7.3.1.1.2-3 of 3GPP TS 38.212)

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| ... | ... | ... | ... | | |
| 11 | 1 layer: TPMI = 11 | 11 | 1 layer: TPMI = 11 | | |
| 12 | 1 layers: TPMI = 12 | 12-15 | reserved | | |
| ... | ... | | | | |
| 27 | 1 layers: TPMI = 27 | | | | |
| 28-31 | reserved | | | | |

2 or 4 bits according to Table 3 for 2 antenna ports, according to whether transform precoder is enabled or disabled, and the values of higher layer parameters maxRank and codebookSubset. That is, 'Precoding information and number of layers' field size takes on values of 4 and 2 bits if codebookSubset is set to 'fullyAndPartialAndNonCoherent' and 'NonCoherent', respectively.

TABLE 3

Precoding information and number of layers, for 2 antenna ports, if transform precoder is disabled and maxRank = 2 (Reproduced from Table 7.3.1.1.2-4 of 3GPP TS 38.212)

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 2 layers: TPMI = 0 | 2 | 2 layers: TPMI = 0 |
| 3 | 1 layer: TPMI = 2 | 3 | reserved |
| 4 | 1 layer: TPMI = 3 | | |
| 5 | 1 layer: TPMI = 4 | | |
| 6 | 1 layer: TPMI = 5 | | |
| 7 | 2 layers: TPMI = 1 | | |
| 8 | 2 layers: TPMI = 2 | | |
| 9-15 | reserved | | |

1 or 3 bits according to Table 4 for 2 antenna ports, if txConfig=codebook, and according to whether transform precoder is enabled or disabled, and the values of higher layer parameters maxRank and codebook-

TABLE 4

Precoding information and number of layers, for 2 antenna ports, if transform precoder is enabled, or if transform precoder is disabled and maxRank = 1 (Reproduced from Table 7.3.1.1.2-5 of 3GPP TS 38.212)

| Bit field mapped to index | codebookSubset = fullyAndPartialAndNonCoherent | Bit field mapped to index | codebookSubset = nonCoherent |
|---|---|---|---|
| 0 | 1 layer: TPMI = 0 | 0 | 1 layer: TPMI = 0 |
| 1 | 1 layer: TPMI = 1 | 1 | 1 layer: TPMI = 1 |
| 2 | 1 layer: TPMI = 2 | | |
| 3 | 1 layer: TPMI = 3 | | |
| 4 | 1 layer: TPMI = 4 | | |
| 5 | 1 layer: TPMI = 5 | | |
| 6-7 | reserved | | | the UE performs PUSCH transmission using the TPMI and number of layers indicated. If one SRS resource is configured in the SRS resource set associated with the higher layer parameter usage of value 'CodeBook', then the PUSCH DMRS is spatially related to the most recent SRS transmission in this SRS resource. If two SRS resources are configured in the SRS resource set associated with the higher layer parameter usage of value 'CodeBook', then the PUSCH DMRS is spatially related to the most recent SRS transmission in the SRS resource indicated by the 'SRS resource indicator' field.

Non-Codebook Based PUSCH

Non-Codebook based UL transmission is available in NR, enabling reciprocity-based UL transmission. By assigning a DL CSI-RS to the UE, it can measure and deduce suitable precoder weights for PUSCH transmission of up to four spatial layers. The candidate precoder weights are transmitted using up to four single-port SRS resources corresponding to the spatial layers. Subsequently, the gNB indicates the transmission rank and multiple SRS resource indicators, jointly encoded using $$\left\lceil \log_2\left( \sum_{k=1}^{\min(L_{max}, N_{SRS})} \binom{N_{SRS}}{k} \right) \right\rceil$$

bits, where $N_{SRS}$ indicates the number of configured SRS resources, and $L_{max}$ is the maximum number of supported layers for PUSCH.

NR Release 16 PUSCH Enhancements

In NR Release 16, PUSCH repetition enhancements were made for both PUSCH type A and type B for the purposes of further latency reduction (i.e., for Rel-16 URLLC).

Pusch Repetition Type A (Slot Based) Enhancements

In NR Rel-15, the number of aggregated slots for both dynamic grant and configured grant Type 2 are RRC configured. In NR Rel-16, this was enhanced so that the number of repetitions can be dynamically indicated, i.e., change from one PUSCH scheduling occasion to the next. That is, in addition to the starting symbol S, and the length of the PUSCH L, a number of nominal repetitions K is signaled as part of time-domain resource allocation (TDRA). Furthermore, the maximum number of aggregated slots was increased to K=16 to account for DL heavy Time Division Duplexing (TDD) patterns. Inter-slot and intra-slot hopping can be applied for Type A repetition. The number of repetitions K is nominal since some slots may be DL slots and are then skipped for PUSCH transmissions. So K is the maximal number of repetitions possible.

Pusch Repetition Type B (Mini-Slot Based) Enhancements

PUSCH repetition Type B applies both to dynamic and configured grants.

Type B PUSCH repetition can cross the slot boundary in Rel-16. When scheduling a transmission with PUSCH repetition Type B, in addition to the starting symbol S, and the length of the PUSCH L, a number of nominal repetitions K is signaled as part of time-domain resource allocation (TDRA) in NR Rel-16. Inter-slot frequency hopping and inter-repetition frequency hopping can be configured for Type B repetition. To determine the actual time domain allocation of Type B PUSCH repetitions, a two-step process is used:

1. Allocate K nominal repetitions of length L back-to-back (adjacent in time), ignoring slot boundaries and TDD pattern.
2. If a nominal repetition crosses a slot boundary or occupies symbols not usable for UL transmission (e.g., UL/DL switching points due to TDD pattern), the offending nominal repetition may be split into two or more shorter actual repetitions. If the number of potentially valid symbols for PUSCH repetition type B transmission is greater than zero for a nominal repetition, the nominal repetition consists of one or more actual repetitions, where each actual repetition consists of a consecutive set of potentially valid symbols that can be used for PUSCH repetition Type B transmission within a slot.

Although the term 'PUSCH repetition' is used in this document, it can be interchangeably used with other terms such as 'PUSCH transmission occasion'.

Redundancy Version

The channel encoder can be controlled by the redundancy version (RV). In NR, an information payload can be encoded with four different RVs, to allow for incremental redundancy decoding. The redundancy version to be applied on the nth transmission occasion of a transport block (TB), where n=0, 1, . . . K−1, is determined according to table below.

TABLE 5

Redundancy version for PUSCH transmission

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

TCI States in NR Downlink

Several signals can be transmitted from different antenna ports of a same base station. These signals can have the same large-scale properties such as Doppler shift/spread, average delay spread, or average delay. These antenna ports are then said to be quasi co-located (QCL).

If the UE knows that two antenna ports are QCL with respect to a certain parameter (e.g., Doppler spread), the UE can estimate that parameter based on one of the antenna ports and apply that estimate for receiving signal on the other antenna port. Typically, the first antenna port is represented by a measurement reference signal such as CSI-RS or SSB (known as source RS) and the second antenna port is a demodulation reference signal (DMRS) (known as target RS).

For instance, if antenna ports A and B are QCL with respect to average delay, the UE can estimate the average delay from the signal received from antenna port A and assume that the signal received from antenna port B has the same average delay. This is useful for demodulation since the UE can know beforehand the properties of the channel, which for instance helps the UE in selecting an appropriate channel estimation filter.

Information about what assumptions can be made regarding QCL is signaled to the UE from the network. In NR, four types of QCL relations between a transmitted source RS and transmitted target RS were defined:
  Type A: {Doppler shift, Doppler spread, average delay, delay spread}
  Type B: {Doppler shift, Doppler spread}
  Type C: {average delay, Doppler shift}
  Type D: {Spatial Rx parameter}

For dynamic beam and Transmission/Reception Point (TRP) selection, a UE can be configured through RRC signalling with up to 128 TCI states for PDSCH in frequency range 2 (FR2) and up to 8 in FR1, depending on UE capability.

Each TCI state contains QCL information, i.e., one or two source DL RSs, each source RS associated with a QCL type. For example, a TCI state contains a pair of reference signals, each associated with a QCL type, e.g., two different CSI-RSs {CSI-RS1, CSI-RS2} is configured in the TCI state as {qcl-Type1,qcl-Type2}={Type A, Type D}. It means the UE can derive Doppler shift, Doppler spread, average delay, and delay spread from CSI-RS1 and Spatial Rx parameter (i.e., the RX beam to use) from CSI-RS2.

The list of TCI states can be interpreted as a list of possible beams transmitted from the network or a list of possible TRPs used by the network to communicate with the UE.

For PDSCH transmission, up to 8 TCI states or pairs of TCI states may be activated, and a UE may be dynamically indicated by a TCI codepoint in DCI one or two of the activated TCI states for PDSCH reception. The UE shall use the TCI-State according to the value of the 'Transmission Configuration Indication' field in the detected PDCCH with DCI for determining PDSCH antenna port quasi co-location.

TCI States for Uplink

In NR Rel-15, the handling of spatial transmission properties is different for PUSCH, PUCCH, and SRS. For PUCCH, the spatial relation information is defined in information element PUCCH-SpatialRelationInfo, and the spatial relation information for SRS is configured as part of SRS resource configuration. The spatial transmission properties for PUSCH are given by the spatial transmission properties associated with the SRS(s) configured in an SRS resource set with usage of 'Codebook' or 'non-Codebook'. In some teachings (such as 3GPP Tdoc R1-1909225 "Enhancements to multibeam operation", referred to herein as [1]), it is argued that the Rel-15 way of handling the spatial transmission properties is cumbersome and inflexible when it comes to uplink multi-panel transmission in NR. Hence, in [1], TCI states for uplink are proposed that can be used to control the spatial properties of all the UL transmissions (i.e., PUSCH, PUCCH, and SRS). The focus in [1] is to be able to use uplink TCI state indication to select one of the uplink panels and the corresponding transmission beam (i.e., transmission properties) at the UE to transmit UL PUSCH/PUCCH/SRS when the UE is equipped with multiple panels.

In general, TCI states for uplink are configured by higher layers (i.e., RRC) for a UE. There are multiple ways of configuring uplink TCI state.

In one case, the UL TCI states are dedicated to only uplink and are configured separately from the TCI states corresponding to downlink. For example, the UL TCI states can be configured as part of the PUSCH-Config information element. Each uplink TCI state may indicate a transmission configuration which contains a DL RS (e.g., NZP CSI-RS or SSB) or a UL RS (e.g., SRS) with the purpose of indicating a spatial relation for PUSCH DMRS. Alternatively, the UL TCI states may be configured as part of BWP-UplinkDedicated information element such that the same UL TCI state can be used to indicate a DL RS or UL RS which provides the spatial relation for more than one of PUSCH DMRS, PUCCH DMRS, and SRS.

In another case, the same list of TCI states is used for DL and UL; hence the UE is configured with a single list of TCI states which can be used for both UL and DL scheduling. The single list of TCI states in this case are configured as part of for example the PDSCH-Config or the BWP-UplinkDedicated information elements.

SUMMARY

Systems and methods to support Physical Uplink Shared Channel PUSCH multi-Transmission/Reception Point (TRP) scheduling are provided. In some embodiments, the wireless device performs one or more of: obtaining a configuration for Transmission Configuration Indicator (TCI) states for Uplink (UL) PUSCH scheduling; activating/deactivating a subset of configured TCI states. If two TCI states are indicated, the wireless device transmits two different PUSCHs each corresponding to one of the indicated TCI states. If one TCI state is indicated, the wireless device transmits a single PUSCH corresponding to the indicated TCI state. The wireless device maps indicated TCI states to the transmission occasions or actual repetitions is preconfigured via higher layer parameter(s) or is given by a predefined rule. The wireless device applies a Transmitted Precoding Matrix Indicator (TPMI) to transmission occasions or actual repetitions associated with each indicated TCI state based on a signaled value and/or a predefined value.

In some embodiments, obtaining the configuration for TCI states for UL PUSCH scheduling comprises receiving the configuration from a network node.

In some embodiments, activating/deactivating the subset of configured TCI States comprises transmitting a control message to the network node activating/deactivating the subset of configured TCI States.

In some embodiments, the control message is a Medium Access Control, MAC, Control Element, CE.

In some embodiments, the MAC CE activates a subset of configured TCI States and maps the activated TCI states to the codepoints of a bit field (e.g., TCI field) in UL Downlink Control Information (DCI). In some embodiments, transmitting the two different PUSCHs targets different TRPs.

In some embodiments, redundancy versions to be applied to each transmission occasion or actual repetition is either indicated by the $rv_{id\ in}$ UL DCI or by a combination of the indicated $rv_{id\ in}$ UL DCI and a UL TCI specific redundancy version offset.

In some embodiments, the UL TCI states are indicated in UL DCI. In some embodiments, the signaled value is signaled via DCI. In some embodiments, the signaled value indicates multiple TPMIs via a single precoder information field.

In some embodiments, the predefined value cycles through TPMIs in a UL codebook.

In some embodiments, a method performed by a base station to support PUSCH, multi-TRP scheduling includes one or more of: transmitting, to a wireless device, a configuration for Transmission Configuration Indicator, TCI, states for Uplink, UL, PUSCH scheduling; receiving, from the wireless device, activation/deactivation of a subset of configured TCI States; if two TCI states are indicated, receiving two different PUSCHs each corresponding to one of the indicated TCI states; if one TCI state is indicated, receiving a single PUSCH corresponding to the indicated TCI state; determining that the indicated TCI states are mapped to the transmission occasions or actual repetitions based on a preconfigured via higher layer parameter(s) or is given by a predefined rule; and/or receiving a transmission with a Transmitted Precoding Matrix Indicator, TPMI, applied to transmission occasions or actual repetitions associated with each indicated TCI state based on a signaled value and/or a predefined value.

Certain embodiments may provide one or more of the following technical advantages. The proposed solutions enable support for PUSCH transmission targeting multiple TRPs using UL TCI indication. By indicating multiple TCI states in UL DCI, the proposed solution allows PUSCH transmission to be targeted towards multiple TRPs for URLLC applications. Indicating different RVs of the same TB towards different TRPs can improve PUSCH reliability which is different from the solution discussed in [1].

Furthermore, using UL TCI states to indicate the spatial relation for PUSCH DMRS allows greater flexibility in allowing the gNB to pick one or more among a larger number of UL TX beams for PUSCH (particularly in FR2) compared to indicating the UL TX beam via the SRI field (where the number of SRS resources configured is limited).

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 shows an example Medium Access Control (MAC) Control Element (CE) for activating Uplink (UL) Transmission Configuration Indicator (TCI) states and mapping them to codepoints of a UL TCI field in UL TCI according to some other embodiments of the present disclosure;

FIG. 8 illustrates an example MAC CE for activating separate TCI states for downlink and uplink to enable multiple Transmission/Reception Point (multi-TRP) transmission according to some other embodiments of the present disclosure;

DETAILED DESCRIPTION

Figure 1:
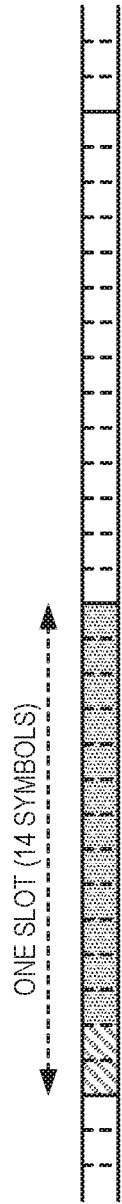
FIG. 1 illustrates data scheduling in New Radio (NR) which is typically in slot basis, an example is shown with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH)
Figure 2:
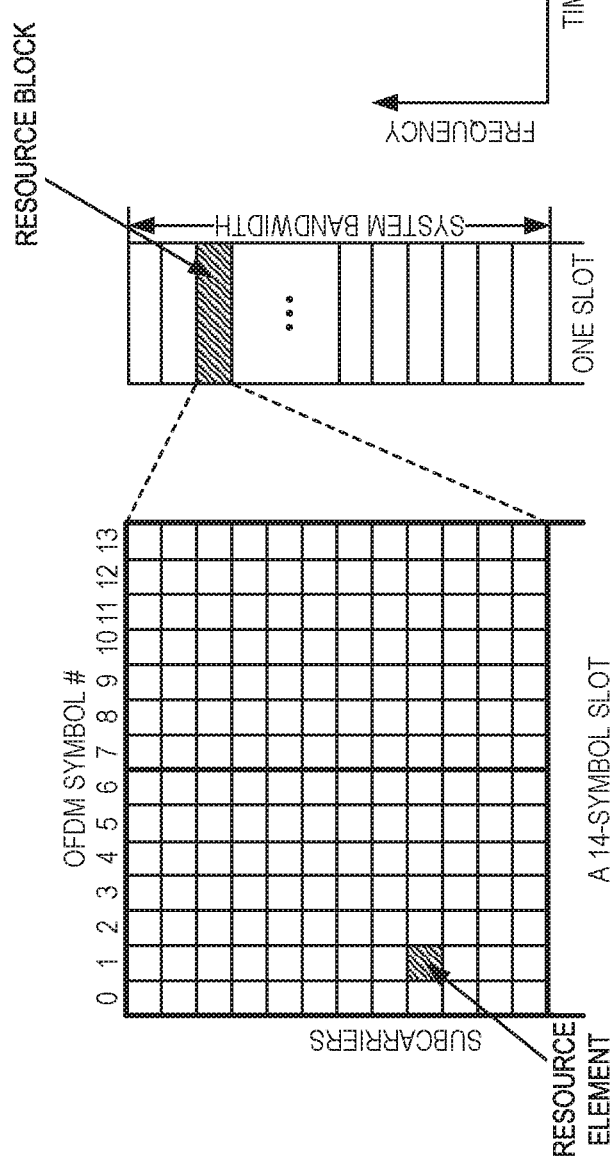
FIG. 2 illustrates a basic NR physical time-frequency resource grid where only one Resource Block (RB) within a 14-symbol slot is shown.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 3:
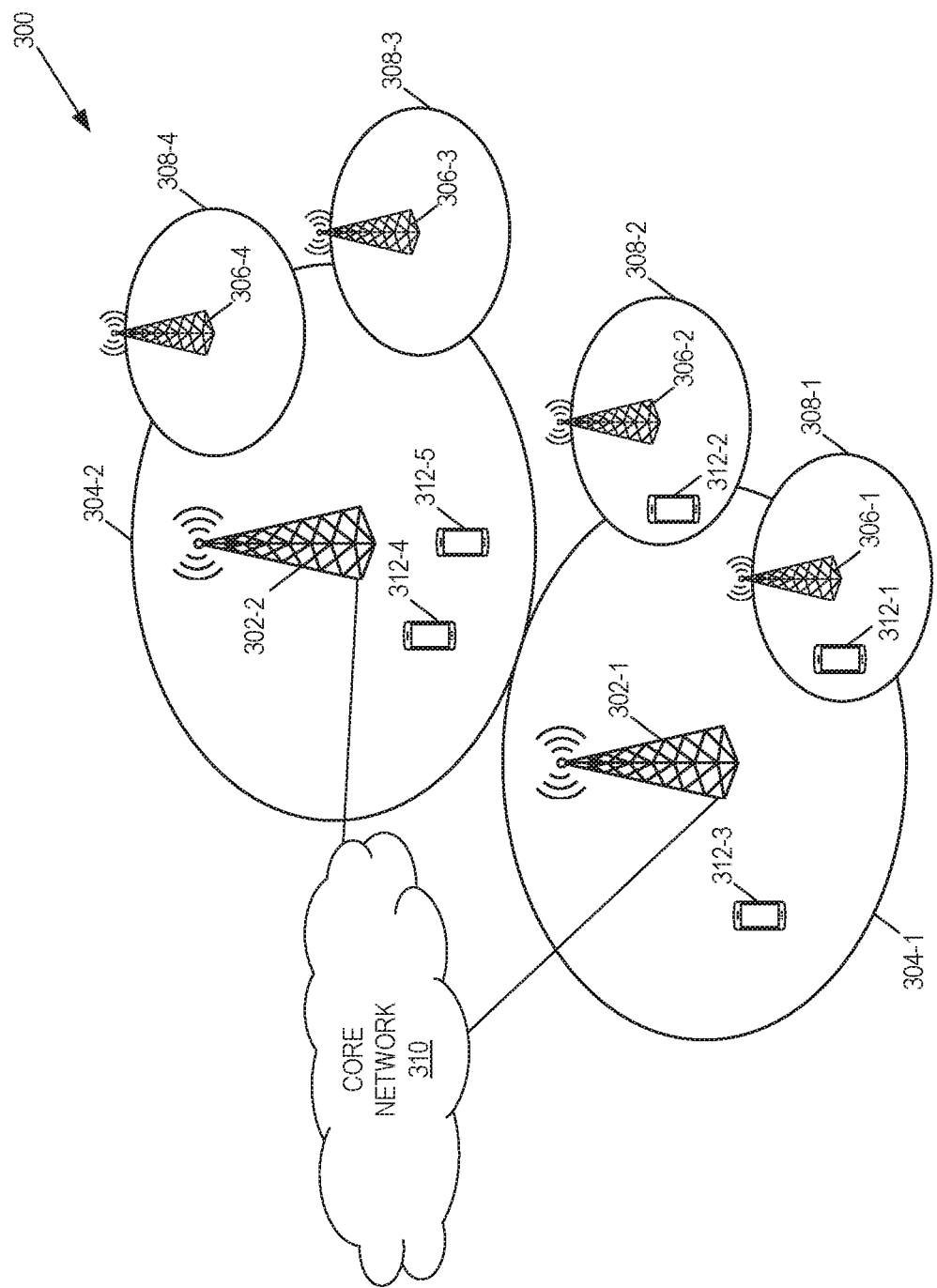
FIG. 3 illustrates one example of a cellular communications system in which embodiments of the present disclosure may be implemented.

FIG. 3 illustrates one example of a cellular communications system 300 in which embodiments of the present disclosure may be implemented. In the embodiments described herein, the cellular communications system 300 is a 5G System (5GS) including a NR RAN. In this example, the RAN includes base stations 302-1 and 302-2, which in 5G NR are referred to as gNBs (e.g., LTE RAN nodes connected to 5G Core (5GC), which are referred to as gn-eNBs), controlling corresponding (macro) cells 304-1 and 304-2. The base stations 302-1 and 302-2 are generally referred to herein collectively as base stations 302 and individually as base station 302. Likewise, the (macro) cells 304-1 and 304-2 are generally referred to herein collectively as (macro) cells 304 and individually as (macro) cell 304. The RAN may also include a number of low power nodes 306-1 through 306-4 controlling corresponding small cells 308-1 through 308-4. The low power nodes 306-1 through 306-4 can be small base stations (such as pico or femto base stations) or Remote Radio Heads (RRHs), or the like. Notably, while not illustrated, one or more of the small cells 308-1 through 308-4 may alternatively be provided by the base stations 302. The low power nodes 306-1 through 306-4 are generally referred to herein collectively as low power nodes 306 and individually as low power node 306. Likewise, the small cells 308-1 through 308-4 are generally referred to herein collectively as small cells 308 and individually as small cell 308. The cellular communications system 300 also includes a core network 310, which in the 5GS is referred to as the 5G Core (5GC). The base stations 302 (and optionally the low power nodes 306) are connected to the core network 310.

The base stations 302 and the low power nodes 306 provide service to wireless communication devices 312-1 through 312-5 in the corresponding cells 304 and 308. The wireless communication devices 312-1 through 312-5 are generally referred to herein collectively as wireless communication devices 312 and individually as wireless communication device 312. In the following description, the wireless communication devices 312 are oftentimes UEs, but the present disclosure is not limited thereto.

Figure 4:
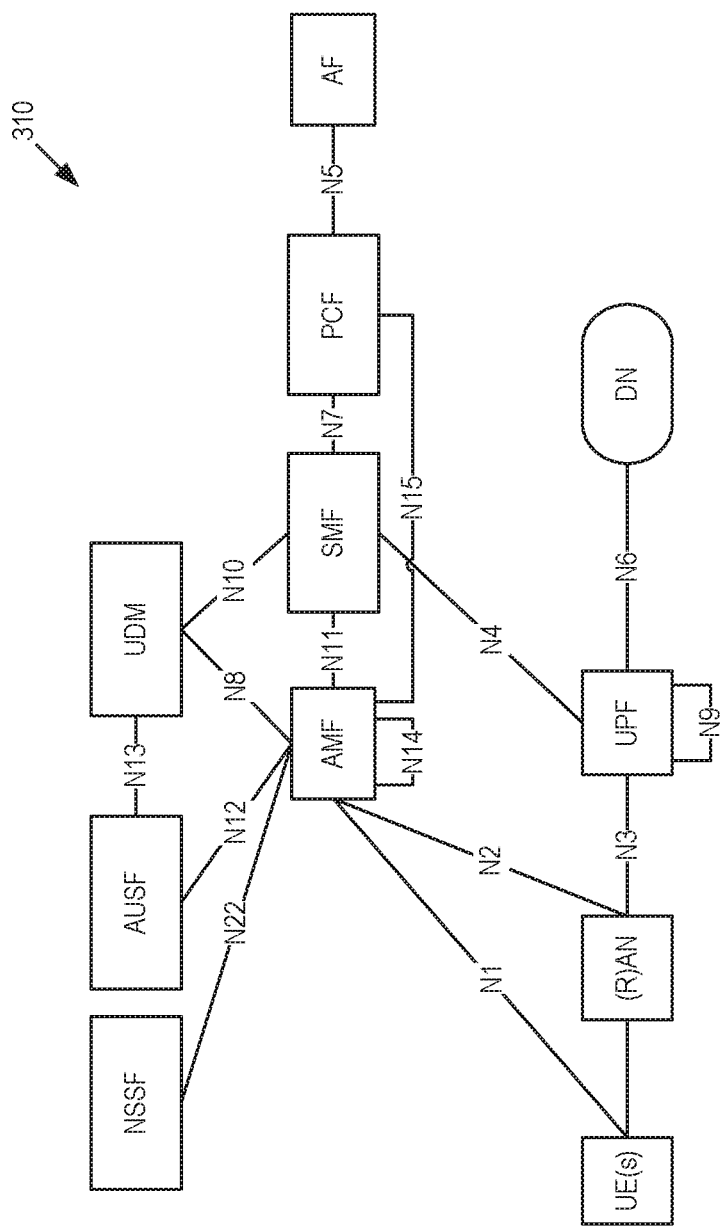
FIG. 4 illustrates a wireless communication system represented as a Fifth Generation (5G) network architecture composed of core Network Functions (NFs), where interaction between any two NFs is represented by a point-to-point reference point/interface, according to some embodiments of the present disclosure.

FIG. 4 illustrates a wireless communication system represented as a 5G network architecture composed of core NFs, where interaction between any two NFs is represented by a point-to-point reference point/interface. FIG. 4 can be viewed as one particular implementation of the system 300 of FIG. 3.

Seen from the access side the 5G network architecture shown in FIG. 4 comprises a plurality of UEs connected to either a RAN or an Access Network (AN) as well as an AMF. Typically, the (R) AN comprises base stations, e.g., such as eNBs or gNBs or similar. Seen from the core network side, the 5G core NFs shown in FIG. 4 include a NSSF, an AUSF, a UDM, an AMF, a SMF, a PCF, and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMF, respectively. N12 is required for the AMF to perform authentication of the UE. N8 and N10 are defined because the subscription data of the UE is required for the AMF and SMF.

The 5GC network aims at separating user plane and control plane. The user plane carries user traffic while the control plane carries signaling in the network. In FIG. 4, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 4. Modularized function design enables the 5GC network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 5:
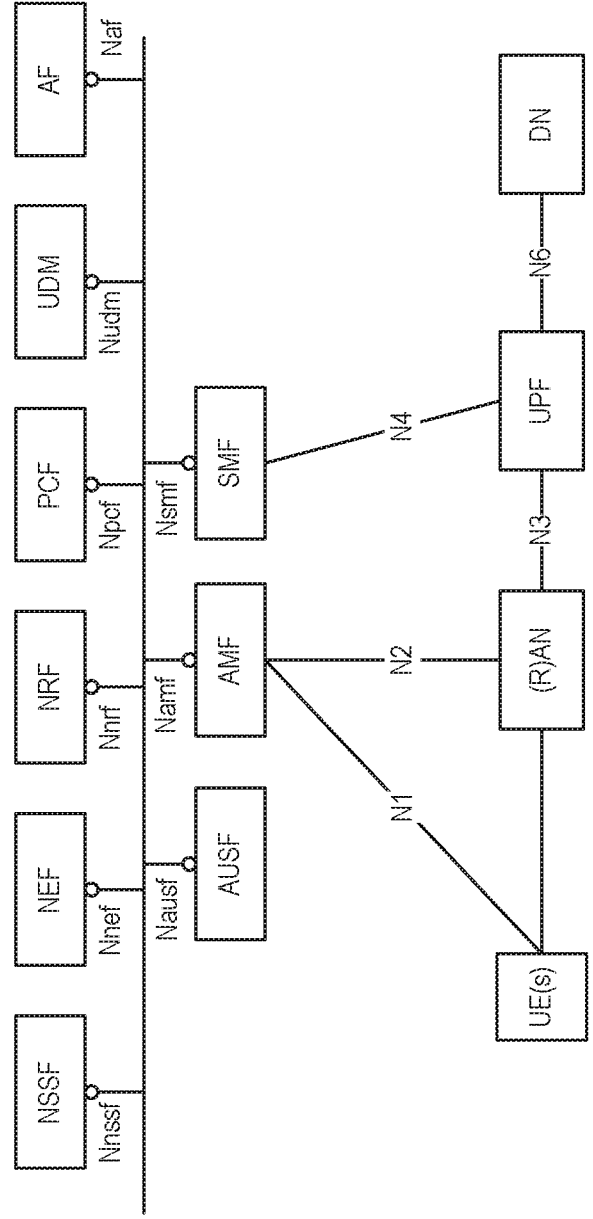
FIG. 5 illustrates a 5G network architecture using service-based interfaces between the NFs in the control plane, instead of the point-to-point reference points/interfaces used in the 5G network architecture of FIG. 4 according to some other embodiments of the present disclosure.

FIG. 5 illustrates a 5G network architecture using service-based interfaces between the NFs in the control plane, instead of the point-to-point reference points/interfaces used in the 5G network architecture of FIG. 4. However, the NFs described above with reference to FIG. 4 correspond to the NFs shown in FIG. 5. The service(s) etc. that a NF provides to other authorized NFs can be exposed to the authorized NFs through the service-based interface. In FIG. 5, the service based interfaces are indicated by the letter "N" followed by the name of the NF, e.g., Namf for the service based interface of the AMF and Nsmf for the service based interface of the SMF etc. The NEF and the NRF in FIG. 5 are not shown in FIG. 4 discussed above. However, it should be clarified that all NFs depicted in FIG. 4 can interact with the NEF and the NRF of FIG. 5 as necessary, though not explicitly indicated in FIG. 4.

Some properties of the NFs shown in FIGS. 4 and 5 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QOS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

There currently exist certain challenges. The proposed solution in [1] uses TCI states to indicate the spatial properties and to select an uplink UE panel for PUSCH transmission, and the focus in [1] is on serving enhanced Mobile Broadband (eMBB) traffic. The solution in [1] does not address how UL TCI state indication can be used for the case when PUSCH is transmitted from the UE to multiple TRPs with high reliability and reduced latency. Hence, for Ultra Reliable Low Latency Communication (URLLC) applications, it is an open problem how to signal the TCI state(s) for multi-TRP based PUSCH transmission with high reliability and reduced latency. As such, improved systems and methods to support PUSCH multiple Transmission/Reception Point (multi-TRP) scheduling are required.

Systems and methods to support PUSCH multi-TRP scheduling are provided. In some embodiments, the wireless device performs one or more of: obtaining a configuration for TCI states for UL PUSCH scheduling; activating/deactivating a subset of configured TCI states). If two TCI states are indicated, the wireless device transmits two different PUSCHs each corresponding to one of the indicated TCI states. If one TCI state is indicated, the wireless device transmits a single PUSCH corresponding to the indicated TCI state. The wireless device maps indicated TCI states to the transmission occasions or actual repetitions and is preconfigured via higher layer parameter(s) or is given by a predefined rule. The wireless device applies a Transmitted Precoding Matrix Indicator (TPMI) to transmission occasions or actual repetitions associated with each indicated TCI state based on a signaled value and/or a predefined value.

The proposed solutions enable support for PUSCH transmission targeting multiple TRPs using UL TCI indication. By indicating multiple TCI states in UL DCI, the proposed solution allows PUSCH transmission to be targeted towards multiple TRPs for URLLC applications. Indicating different RVs of the same TB towards different TRPs can improve PUSCH reliability which is different from the solution discussed in [1].

Furthermore, using UL TCI states to indicate the spatial relation for PUSCH DMRS allows greater flexibility in allowing the gNB to pick one or more among a larger number of UL TX beams for PUSCH (particularly in FR2) compared to indicating the UL TX beam via the SRI field (where the number of SRS resources configured is limited).

Figure 6:
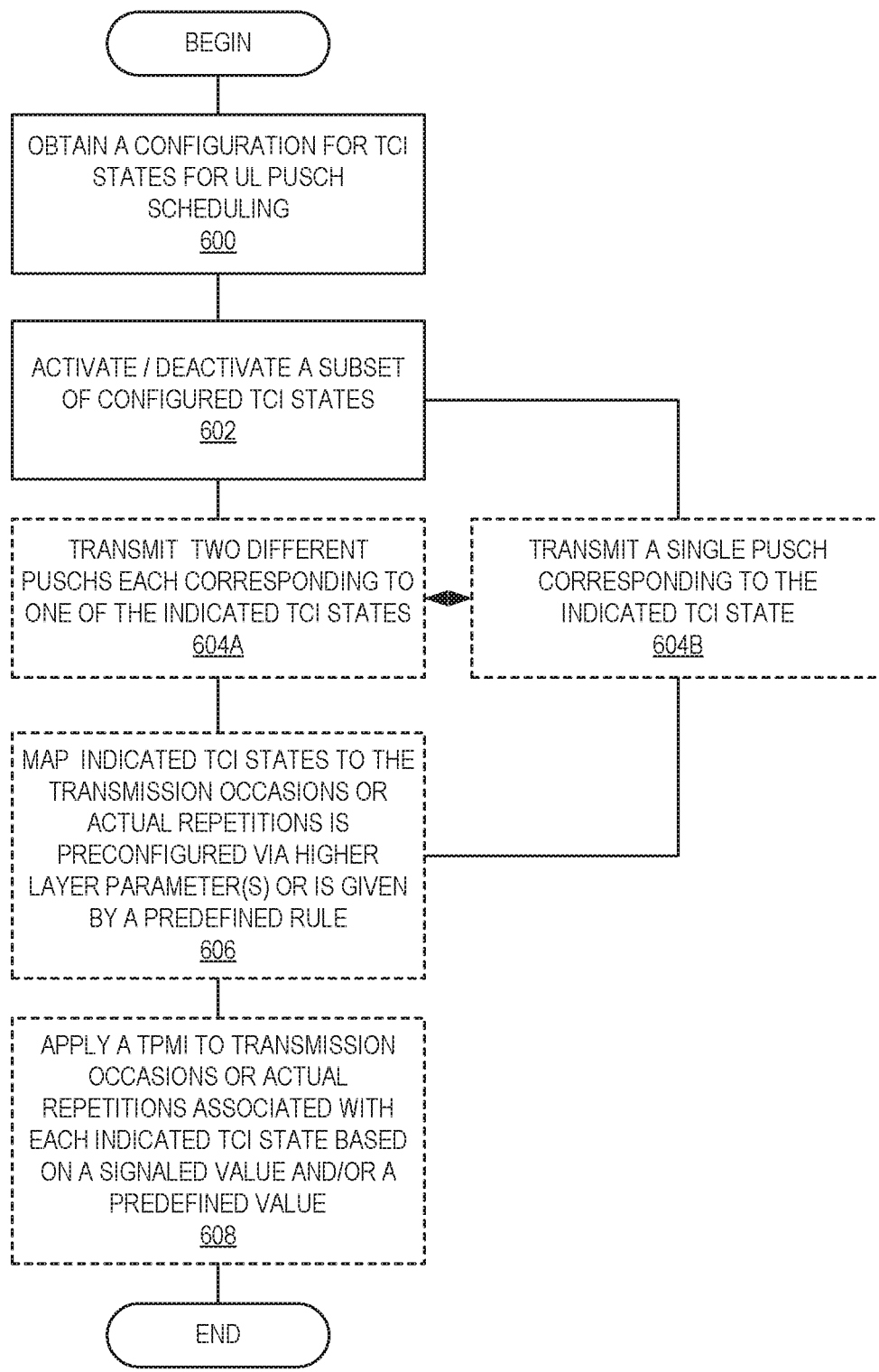
FIG. 6 illustrates a method performed by a wireless device to support PUSCH multi-TRP scheduling according to some other embodiments of the present disclosure.

FIG. 6 illustrates a method performed by a wireless device to support PUSCH multi-TRP scheduling. In some embodiments, the wireless device obtains a configuration for TCI states for UL PUSCH scheduling (step 600). The wireless device activates/deactivates a subset of configured TCI States (step 602). If two TCI states are indicated, the wireless device transmits two different PUSCHs each corresponding to one of the indicated TCI states (step 604A). If one TCI state is indicated, the wireless device transmits a single PUSCH corresponding to the indicated TCI state (step 604B). The wireless device maps indicated TCI states to the transmission occasions or actual repetitions and is preconfigured via higher layer parameter(s) or is given by a predefined rule (step 606). The wireless device applies a Transmitted Precoding Matrix Indicator (TPMI) to transmission occasions or actual repetitions associated with each indicated TCI state based on a signaled value and/or a predefined value (step 608).

In some embodiments, one or more of the following steps is performed in order to support PUSCH multi-TRP scheduling via indication of UL TCI states in UL TCI:

- UE is configured with TCI states for UL PUSCH scheduling by the network.
- UL TCI states for UL PUSCH Multi-TRP scheduling are activated/deactivated via a MAC CE control message sent to the UE from the network. The MAC CE activates a subset of configured TCI States and maps the activated TCI states to the codepoints of a bit field (e.g., TCI field) in UL DCI.
- When two TCI states are indicated in UL DCI, the UE transmits two different PUSCHs (i.e., targeting different TRPs) each corresponding to one of the indicated TCI states. If one TCI state is indicated in UL DCI, the UE transmits a single PUSCH corresponding to the indicated TCI state.

The mapping of indicated TCI states to the transmission occasions or actual repetitions is preconfigured via higher layer parameter(s) or is given by a predefined rule.

The redundancy versions to be applied to each transmission occasion or actual repetition are either indicated by the $rv_{id\ in}$ UL DCI or by a combination of the indicated $rv_{id\ in}$ UL DCI and a UL TCI specific redundancy version offset.

The TPMIs to be applied to transmission occasions or actual repetitions associated with each indicated TCI state are either signaled via DCI (i.e., indicating multiple TPMIs via a single precoder information field) or is predefined (i.e., cycling through TPMIs in a UL codebook).

Details of the above steps are given in the remaining sections.

Activation/Deactivation of TCI States for PUSCH Multi-TRP Scheduling

In this embodiment, different alternatives are presented for how the TCI states for PUSCH Multi-TRP scheduling are activated/deactivated. In a first alternative in Section 5.2.1, activation/deactivation of TCI states for PUSCH Multi-TRP scheduling is presented for the case when UL TCI states dedicated to only uplink are configured (i.e., separately from TCI states corresponding to downlink). In a second alternative in Section 5.2.2, activation/deactivation of TCI states for PUSCH Multi-TRP scheduling is presented for the case when the same list of TCI states is used for both uplink and downlink scheduling.

Alternative 1

In this embodiment, a MAC CE is used to activate a subset of the UL TCI states. The activated UL TCI states can be used to indicate at least spatial relation information for PUSCH transmissions. In the MAC CE, a mapping between a codepoint of a bit field in UL DCI (i.e., a DCI that schedules PUSCH, triggers aperiodic/semi-persistent CSI, triggers aperiodic SRS, or activates UL configured grant transmission) and the one or more activated UL TCI states are be indicated. Since the UL TCI states are separately configured from TCI states for downlink in this embodiment, a MAC CE dedicated to activating these UL TCI states is sent from the gNB to the UE (i.e., this MAC CE is separate from the MAC CEs used for activating TCI states for downlink). The use of dedicated MAC CE for activating UL TCI states is that it provides the flexibility to activate UL TCI states independent of the TCI states activated for downlink.

Table 6 shows an example mapping between codepoints of a bit field in UL DCI and on or more activated UL TCI states. In this example, codepoints 3, 4, and 5 are mapped to two UL TCI states which correspond to PUSCH transmission targeting two TRPs (e.g., UL TCI states mapped to codepoint 4 with UL-TCI-StateIds 1 and 5 corresponds to PUSCH transmission towards TRP #1 and TRP #3, respectively). Furthermore, codepoints 0, 1, 6, and 7 are mapped to one UL TCI states which correspond to PUSCH transmission targeting one TRP. Hence, depending on which codepoint is triggered by UL DCI, the UE can be scheduled to transmit PUSCH towards a single TRP (e.g., for eMBB data which do not have very stringent reliability requirements) or two TRPs (e.g., for URLLC data which have very stringent reliability requirements).

TABLE 6

An example showing mapping of UL TCI sates to codepoints in a bit field of UL DCI

| Codepoint in a bit field of UL DCI | UL TCI state(s) mapped to codepoint in UL DCI bit field | TRP(s) to which PUSCH transmission(s) is/are targeted |
|---|---|---|
| 0 | UL-TCI-StateId = 0 | TRP#1 |
| 1 | UL-TCI-StateId = 2 | TRP#2 |
| 2 | UL-TCI-StateId = 4 | TRP#3 |
| 3 | UL-TCI-StateId = 0 + UL-TCI-StateId | TRP#1 + TRP#2 |
| 4 | UL-TCI-StateId = 1 + UL-TCI-StateId | TRP#1 + TRP#3 |
| 5 | UL-TCI-StateId = 2 + UL-TCI-StateId | TRP#2 + TRP#3 |
| 6 | UL-TCI-StateId = 1 | TRP#1 |
| 7 | UL-TCI-StateId = 3 | TRP#2 |

FIG. 7 shows an example MAC CE for activating UL TCI states and mapping them to codepoints of a UL TCI field in UL TCI. In the MAC CE, the fields 'UL TCI State $ID_{ij}$' represents the $j^{th}$ UL TCI state mapped to the $i^{th}$ codepoint of the bit field in UL DCI. The field corresponding to the first UL TCI state of the $i^{th}$ codepoint of the bit field in UL DCI (i.e., the field 'UL TCI State $ID_{i,0}$') is always present in the MAC CE. The field '$C_i$' indicates if an additional UL TCI state will be associated with the $i^{th}$ codepoint of the bit field in UL DCI. For example, if $C_N$=0, then the field 'UL TCI State $ID_{N,2}$' is not present in the MAC CE. In this case, there is only one UL TCI state that is mapped to the $N^{th}$ codepoint of the bit field in UL DCI.

if $C_N$=1, then the field 'UL TCI State $ID_{N,2}$' is present in the MAC CE. In this case, there are two UL TCI states that are mapped to the $N^{th}$ codepoint of the bit field in UL DCI.

Those UL TCI states that are not indicated as part of the MAC CE are assumed to be deactivated.

Alternative 2

In this embodiment, when the same list of TCI states is used for both DL and UL (e.g., the TCI states that are configured as part of PDSCH-Config), a MAC CE separate from the one used to activate TCI states for DL may be used to indicate the mapping between a codepoint of the bit field and one or more TCI states for UL. Hence, even though the TCI states are from the same list, DL and UL may have different activated TCI states. The purpose of separate MAC CEs for activating UL TCI states from DL TCI states is that it provides the flexibility to activate UL TCI states independent of the TCI states activated for downlink. Having separate TCI states activated for UL and DL allows different spatial beams to be used for DL reception and UL transmission from the UE's perspective since in some scenarios the best downlink reception beam may be different from the best uplink transmission beam.

In another embodiment, in one MAC CE, the gNB can separately indicate the activated TCI states for uplink and the TCI states for downlink. An example of such a MAC CE is given in FIG. 8. FIG. 8 illustrates an example MAC CE for activating separate TCI states for downlink and uplink to enable multi-TRP transmission.

In the example of FIG. 8, the TCI states to be activated for downlink are provided in Octets 2 to M of the MAC CE. These TCI states are mapped to the codepoints of DL DCIs (either one TCI state or two TCI states can be mapped to each codepoint in a field of DL DCI). In the MAC CE, the field '$D_i$' indicates if an additional TCI state for downlink will be associated with the $i^{th}$ codepoint of the bit field in DL DCI. The number of codepoints in the DL DCI in FIG. 8 is given by N.

In the example of FIG. 8, the TCI states to be activated for uplink are provided in Octets M+1 to M' of the MAC CE. These TCI states are mapped to the codepoints of UL DCIs (either one TCI state or two TCI states can be mapped to each codepoint in a field of UL DCI). In the MAC CE, the field 'D$_i$' indicates if an additional TCI state for uplink will be associated with the $i^{th}$ codepoint of the bit field in UL DCI. The number of codepoints in the UL DCI in FIG. 8 is given by P.

For example, the MAC CE of FIG. 8 may provide activation of TCI states for 16 codepoints where the first eight codepoints correspond to codepoints in a field of DL DCI and the next eight codepoints correspond to codepoints in a field of UL DCI. With this embodiment, efficient activation/deactivation of TCI states can be achieved using a single MAC CE without the need to send separate MAC CE messages for uplink and downlink.

In yet another embodiment, when the same list of TCI states is used for both DL and UL, a single MAC CE may be used to activate TCI states, and the same activated TCI states are used for both DL and UL scheduling, i.e., the TCI codepoint in DCI points to the same entry in the TCI state list irrespective of whether the DCI is a UL DCI or DL DCI. This embodiment is beneficial when the same spatial beams can be used for DL reception and UL transmission from UE's perspective in certain scenarios where the best downlink reception beam is the same as the best uplink transmission beam.

Indication of Activated TCI States Via UL DCI for PUSCH Multi-TRP Scheduling

A bit field in UL DCI may be used to indicate one or more of the activated TCI states for the PUSCH transmission. In one embodiment, a dedicated UL TCI field is present in the UL DCI which is used to indicate the one or more activated UL TCI states. The presence of a TCI state field in UL DCI can be configured by higher layer signaling from the network to the UE. For example, a higher layer parameter ul-tci-PresentInDCI may be configured per control Resource Set (CORESET) to enable/disable the presence of the UL TCI field in a UL DCI scheduled via a PDCCH in that CORESET. In another example, separate higher layer parameters may be configured per CORESET for different UL DCI formats to enable the presence of the UL TCI field (e.g., ul-tci-PresentInDCI for DCI format 0_1 and ul-tci-PresentInDCIformat0_2 for DCI format 0_2). The number of bits in the DCI indicating the UL-TCI state can be configured by higher layer configurations in, for example, PDCCH-Config, or decided as number of bits associated with downlink TCI interpretation in the downlink DCI 1_1 or 1_2, or as a number associated with UE capability.

Figure 9:
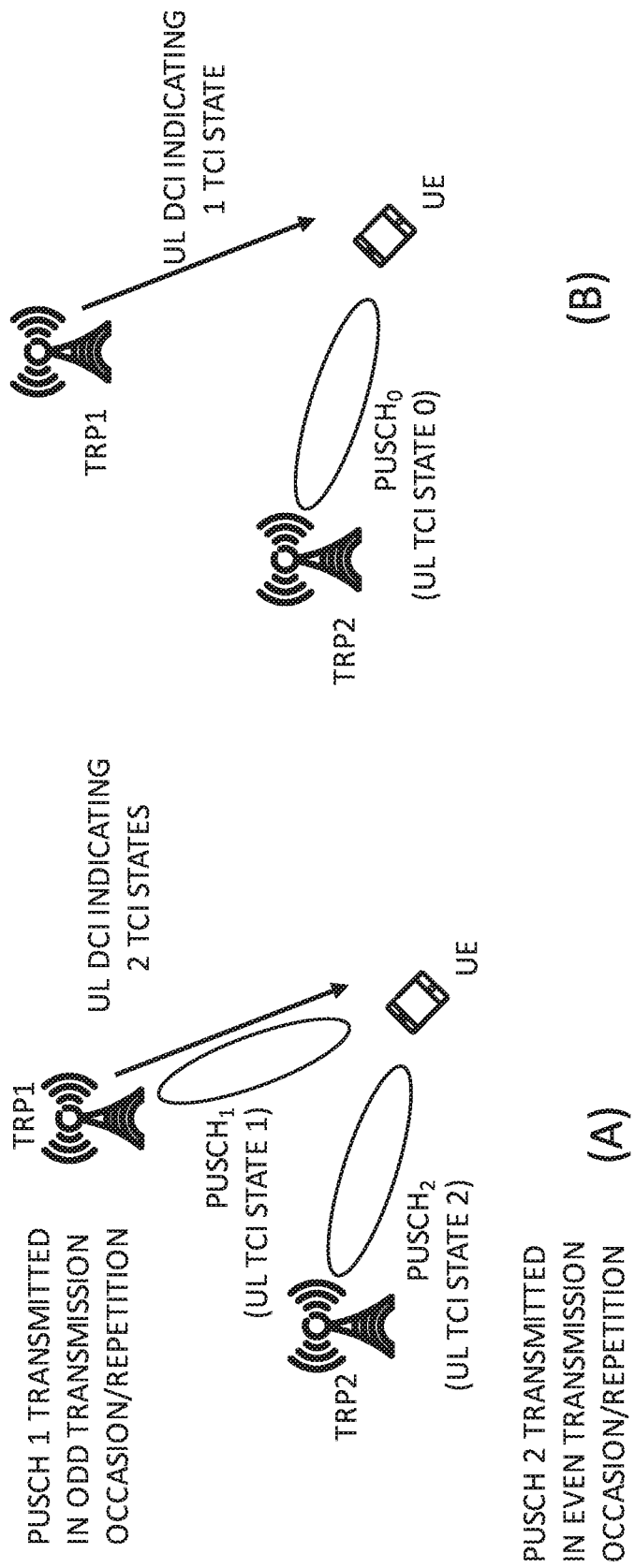
FIG. 9 illustrates an example showing PUSCH transmission for the cases (a) when two TCI states are indicated to the UE in UL DCI and (b) when one TCI state is indicated to the UE in UL DCI according to some other embodiments of the present disclosure.

If the UE is indicated with a single TCI state via a codepoint in a field in UL DCI and if multiple PUSCH transmission occasions (or repetitions) are configured or indicated to the UE, then the UE transmits PUSCH according to the indicated single TCI state in all transmission occasions. FIG. 9 illustrates an example showing PUSCH transmission for the cases (a) when two TCI states are indicated to the UE in UL DCI and (b) when one TCI state is indicated to the UE in UL DCI. An example is shown in FIG. 9B where the UL DCI indicates one TCI state and the UE transmits PUSCH$_0$ according to the indicated TCI state (e.g., UL TCI state 0) in all transmission occasions. Here, the PUSCH DMRS of the PUSCH$_0$ transmission is spatially related to the DL RS or UL RS indicated in UL TCI state 0 that provides the spatial relation. The same spatial relation is used when transmitting PUSCH$_0$ in all transmission occasions.

If the UE is indicated with two TCI states via a codepoint in a field in UL DCI and if multiple PUSCH transmission occasions (or repetitions) are configured or indicated to the UE, then the UE would transmit PUSCH in multiple transmission occasions according to the indicated TCI states. An example is shown in FIG. 9A where the UL DCI indicates two TCI states. In this example, the UE transmits PUSCH$_1$ (according to the UL TCI state 1) and PUSCH$_2$ (according to the UL TCI state 2) in different Transmission occasions. If more than two PUSCH transmission occasions are indicated, then the first TCI state indicated may be used in the odd numbered PUSCH transmission occasions and the second TCI state may be used in the even numbered PUSCH occasions, or the other way around. Alternatively, a repetition pattern may be RRC configured. The transmission occasions in some embodiment may be multiplexed in the time domain or frequency domain.

In one case, when PUSCH repetition Type A is used, the different transmission occasions are transmitted in different slots. Hence, when two TCI states are indicated in UL DCI, the PUSCH transmission corresponding to transmission occasions in odd slots correspond to the first indicated TCI state, and the PUSCH transmission corresponding to transmission occasions in even slots correspond to the second indicated TCI state. Alternatively, when two TCI states are indicated in UL DCI, the PUSCH transmission corresponding to transmission occasions in the first two slots corresponds to the first indicated TCI state, and the PUSCH transmission corresponding to transmission occasions in the next two slots corresponds to the second indicated TCI state. This pattern is continued until the total number of transmission occasions is reached.

In another case, when PUSCH repetition Type B is used, the different actual repetitions are transmitted in mini-slots. Hence, when two TCI states are indicated in UL DCI, the PUSCH transmissions in odd numbered actual repetitions correspond to the first indicated TCI state, and the PUSCH transmission corresponding to the even numbered actual repetitions corresponds to the second indicated TCI state. Alternatively, when two TCI states are indicated in UL DCI, the PUSCH transmission corresponding to the first two actual repetitions corresponds to the first indicated TCI state, and the PUSCH transmission corresponding to the next two actual repetitions corresponds to the second indicated TCI state. This pattern is continued until the total number of actual repetitions is reached.

When multiple TCI states are indicated in a UL DCI, the redundancy version to be applied to a given transmission occasion or actual repetition is given according the $rv_{id}$ indicated by the DCI scheduling the PUSCH and following the pattern given in Table 5. That is, the redundancy version sequence defined in Rel-15/16 may be applied in a per UL TCI basis. The PUSCH transmissions corresponding to the two TCI states may use the same or different redundancy versions of the same TB.

In some embodiments, when two TCI states are indicated in a UL DCI, the redundancy version to be applied to the transmission occasions/actual repetitions corresponding to the first indicated TCI state is given according the $rv_{id\ indicated}$ by the DCI scheduling the PUSCH and following the pattern given in Table 5. The redundancy version to be applied to the transmission occasions/actual repetitions corresponding to the second indicated TCI state is given according the $rv_{id\ indicated}$ by the DCI scheduling the PUSCH and following the pattern given in Table 7 where an RRC configurable parameter specific to uplink $rv_{UL,s}$ is used to shift the RV. In this embodiment, n is counted only considering the transmission occasions/actual repetitions associated with the corresponding TCI state. The benefit of using such a configurable RV shift in uplink is allows the Rel-15 RV sequences to be applied per uplink TCI state.

TABLE 7

Redundancy version corresponding to the $2^{nd}$ uplink TCI state when a redundancy version shifting parameter is configured for uplink

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
| --- | --- | --- | --- | --- |
| | n mod 4 = 0 | n mod 4 = 1 | n mod 4 = 2 | n mod 4 = 3 |
| 0 | $(0 + rv_{UL,s})$ mod 4 | $(2 + rv_{UL,s})$ mod 4 | $(3 + rv_{UL,s})$ mod 4 | $(1 + rv_{UL,s})$ mod 4 |
| 2 | $(2 + rv_{UL,s})$ mod 4 | $(3 + rv_{UL,s})$ mod 4 | $(1 + rv_{UL,s})$ mod 4 | $(0 + rv_{UL,s})$ mod 4 |
| 3 | $(3 + rv_{UL,s})$ mod 4 | $(1 + rv_{UL,s})$ mod 4 | $(0 + rv_{UL,s})$ mod 4 | $(2 + rv_{UL,s})$ mod 4 |
| 1 | $(1 + rv_{UL,s})$ mod 4 | $(0 + rv_{UL,s})$ mod 4 | $(2 + rv_{UL,s})$ mod 4 | $(3 + rv_{UL,s})$ mod 4 |

Figure 10:
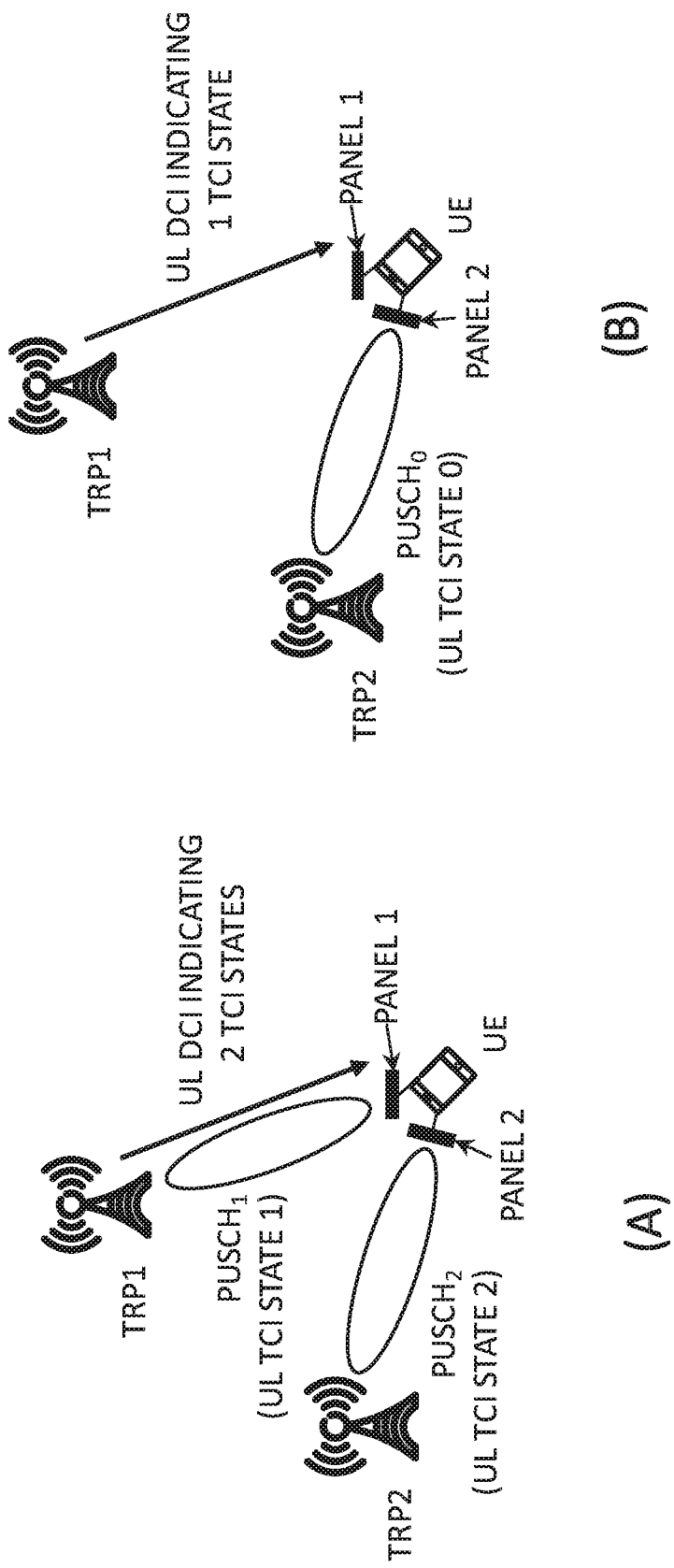
FIG. 10 illustrates an example showing PUSCH transmission when the UE is equipped with two panels for the cases (a) when two TCI states are indicated to the UE in UL DCI and (b) when one TCI state is indicated to the UE in UL DCI according to some other embodiments of the present disclosure.

In another embodiment, one or two TCI states indicated in a field in UL DCI can be indicated to a UE equipped with two panels. In this case, the panel ID can be indicated as part of the UL TCI to the UE (which tells the UE which panels to use). If the two TCI states indicated in UL DCI are associated with different panel IDs, then the UE would transmit PUSCH in according to the indicated TCI states using the indicated panels. FIG. 10 illustrates an example showing PUSCH transmission when the UE is equipped with two panels for the cases (a) when two TCI states are indicated to the UE in UL DCI and (b) when one TCI state is indicated to the UE in UL DCI. An example is shown in FIG. 10A where the UL DCI indicates two TCI states to a UE with two panels. In this example, the UE transmits PUSCH$_1$ (according to the UL TCI state 1) using the first panel and PUSCH$_2$ (according to the UL TCI state 2) using the second panel. It should be noted that since the transmission of PUSCH$_1$ and PUSCH$_2$ are from different panels, it is possible to transmit both these PUSCHs in the same slot or mini-slot if the UE supports simultaneous transmission from both panels. However, if a UE only supports transmission from one of the panels at a given time, then the transmission of PUSCH$_1$ and PUSCH$_2$ can be in different transmission occasions/actual repetitions.

If the UE is indicated with a single TCI state via a codepoint in a field in UL DCI and if multiple PUSCH transmission occasions (or repetitions) are configured or indicated to the UE, then the UE transmits PUSCH according to the indicated single TCI state in all transmission occasions. An example is shown in FIG. 9B or FIG. 10B where the UL DCI indicates one TCI state and the UE transmits PUSCH$_0$ according to the indicated TCI state (e.g., UL TCI state 0) in all transmission occasions. Here, the PUSCH DMRS of the PUSCH$_0$ transmission is spatially related to the DL RS or UL RS indicated in the UL TCI state 0 that provides the spatial relation. The same spatial relation is used when transmitting PUSCH$_0$ in all transmission occasions.

If the UE is indicated with two TCI states via a codepoint in a field in UL DCI and if multiple PUSCH transmission occasions (or repetitions) are configured or indicated to the UE, then the UE would transmit PUSCH in multiple transmission occasions according to the indicated TCI states. An example is shown in FIG. 9A or FIG. 10A where the UL DCI indicates two TCI states. In this example, the UE transmits PUSCH$_1$ (according to the UL TCI state 1) and PUSCH$_2$ (according to the UL TCI state 2) in different Transmission occasions. If more than two PUSCH transmission occasions are indicated, then the first TCI state indicated may be used in the odd numbered PUSCH transmission occasions and the second TCI state may be used in the even numbered PUSCH occasions, or the other way around. Alternatively, a repetition pattern may be RRC configured. The transmission occasions in some embodiment may be multiplexed in the time domain or frequency domain.

Since the number of PUSCH layers (i.e., transmission rank) in most URLLC applications is 1, the number of PUSCH layers to be transmitted may also be determined by the number of UL TCI states indicated to the UE via UL DCI. For instance, when a single TCI state is indicated to the UE in UL DCI, the UE determines its PUSCH transmission precoder and transmission rank following the Precoding information and number of layers fields in UL DCI as in NR Rel-15/16. However, when more than one TCI state is indicated to the UE in UL DCI, the transmission rank is limited to one for each of the PUSCH transmission corresponding to each indicated TCI state. In some embodiments, when more than one TCI state is indicated to the UE in UL DCI, the UE expects the PUSCH transmission precoder to correspond to one of the TPMI values with a single transmission layer. In this case, the UE ignores the number of layers indicated by the Precoding information and number of layers fields in UL DCI.

Figure 11:
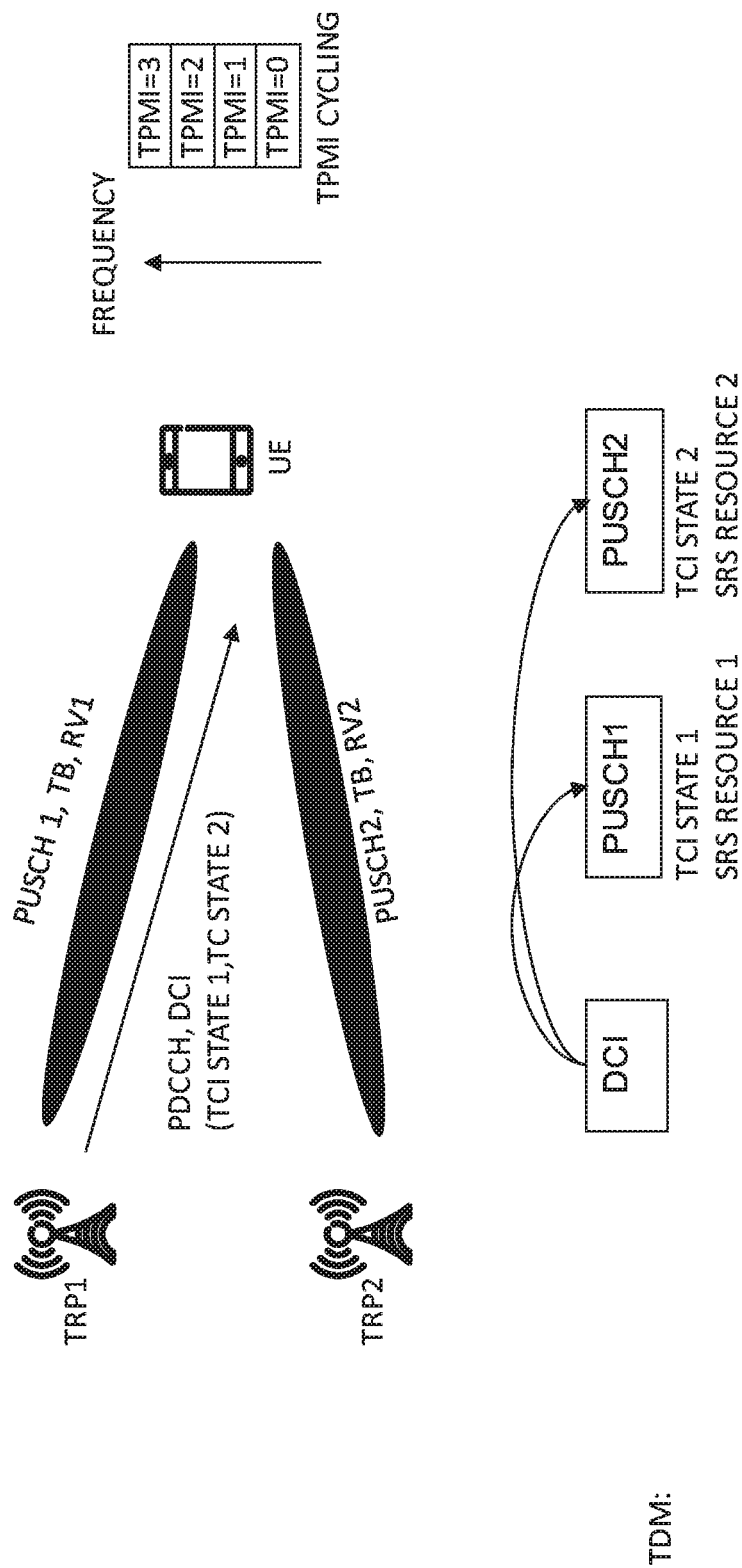
FIG. 11 illustrates where two TCI states are indicated in a DCI scheduling two PUSCH transmission occasions for a same TB according to some other embodiments of the present disclosure.

In one embodiment, the UE may cycle through multiple TPMIs in a UL codebook on different RBs of the allocated PUSCH resource. An example is shown in FIG. 11, where two TCI states are indicated in a DCI scheduling two PUSCH transmission occasions for a same TB. In one specific embodiment, since the URLLC transmissions mostly require a single transmission layers, only TPMIs corresponding to single layers from the UL codebook are cycled through in different RBs of the allocated PUSCH resources.

When a single TCI state is indicated to the UE in UL DCI, the UE determines its PUSCH transmission precoder and transmission rank following the Precoding information and number of layers fields in UL DCI as in NR Rel-15/16. However, when more than one TCI state is indicated to the UE in UL DCI, new precoding information tables are introduced in the specifications which contain only single layer TPMIs, and each codepoint in the 'Precoding information and number of layers' indicates two such TPMIs. An example table is shown in Table 8. In this embodiment, when more than two TCI states are indicated to the UE in UL DCI and the precoding information field indicates a value of 1 (with codebookSubset=fullyAndPartialAndNonCoherent), then TPMI=2 with 1 layer is used for PUSCH transmission corresponding to the first TCI state and TPMI=1 with 1 layer is used for PUSCH transmission corresponding to the second TCI state.

TABLE 8 single layer Precoding information table for 2 antenna ports, if transform precoder is disabled. The table is to be used when two TCI states are indicated in UL DCI.

| Bit field mapped to index | codebookSubset = fullyAndPartialAndNonCoherent | Bit field mapped to index | codebookSubset = nonCoherent |
|---|---|---|---|
| 0 | (1 layer: TPMI = 0, 1 layer: TPMI = 1) | 0 | (1 layer: TPMI = 0, 1 layer: TPMI = 0) |
| 1 | (1 layer: TPMI = 2, 1 layer: TPMI = 1) | 1 | (1 layer: TPMI = 0, 1 layer: TPMI = 1) |
| 2 | (1 layer: TPMI = 3, 1 layer: TPMI = 1) | 2 | (1 layer: TPMI = 1, 1 layer: TPMI = 0) |
| 3 | (1 layer: TPMI = 4, 1 layer: TPMI = 1) | 3 | (1 layer: TPMI = 1, 1 layer: TPMI = 1) |
| 4 | (1 layer: TPMI = 5, 1 layer: TPMI = 1) | | |
| 5 | (1 layer: TPMI = 1, 1 layer: TPMI = 0) | | |
| 6 | (1 layer: TPMI = 2, 1 layer: TPMI = 0) | | |
| 7 | (1 layer: TPMI = 3, 1 layer: TPMI = 0) | | |
| 8 | (1 layer: TPMI = 4, 1 layer: TPMI = 0) | | |
| 9 | (1 layer: TPMI = 5, 1 layer: TPMI = 0) | | |
| 10 | (1 layer: TPMI = 0, 1 layer: TPMI = 2) | | |
| 11 | (1 layer: TPMI = 1, 1 layer: TPMI = 2) | | |
| 12 | (1 layer: TPMI = 3, 1 layer: TPMI = 2) | | |
| 13 | (1 layer: TPMI = 4, 1 layer: TPMI = 2) | | |
| 14 | (1 layer: TPMI = 5, 1 layer: TPMI = 2) | | |
| 15 | (1 layer: TPMI = 5, 1 layer: TPMI = 3) | | |

In an alternative embodiment, the Service Request Indicator (SRI) field is reused to alternatively indicate a TCI state, and this alternative functionality is enabled by higher layer signaling from network to the UE. In this alternative embodiment, each codepoint of an M-bit SRI field is mapped to either one or multiple UL TCI states which are then used to indicate the spatial relation for PUSCH DMRS to the UE.

Figure 12:
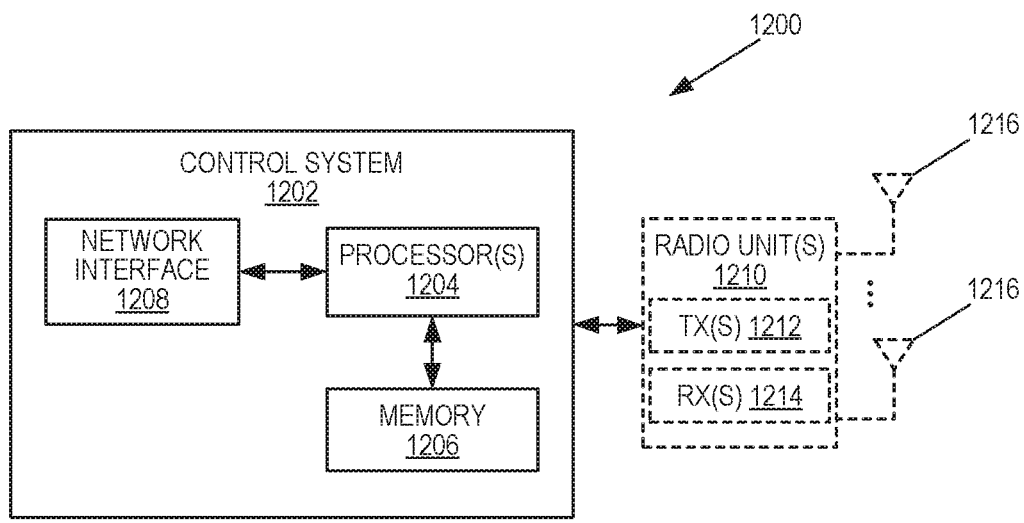
FIG. 12 is a schematic block diagram of a radio access node according to some embodiments of the present disclosure.

FIG. 12 is a schematic block diagram of a radio access node 1200 according to some embodiments of the present disclosure. Optional features are represented by dashed boxes. The radio access node 1200 may be, for example, a base station 302 or 306 or a network node that implements all or part of the functionality of the base station 302 or gNB described herein. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the radio access node 1200 may include one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200 as described herein. In some embodiments, the function(s) are implemented in software that is stored, e.g., in the memory 1206 and executed by the one or more processors 1204.

Figure 13:
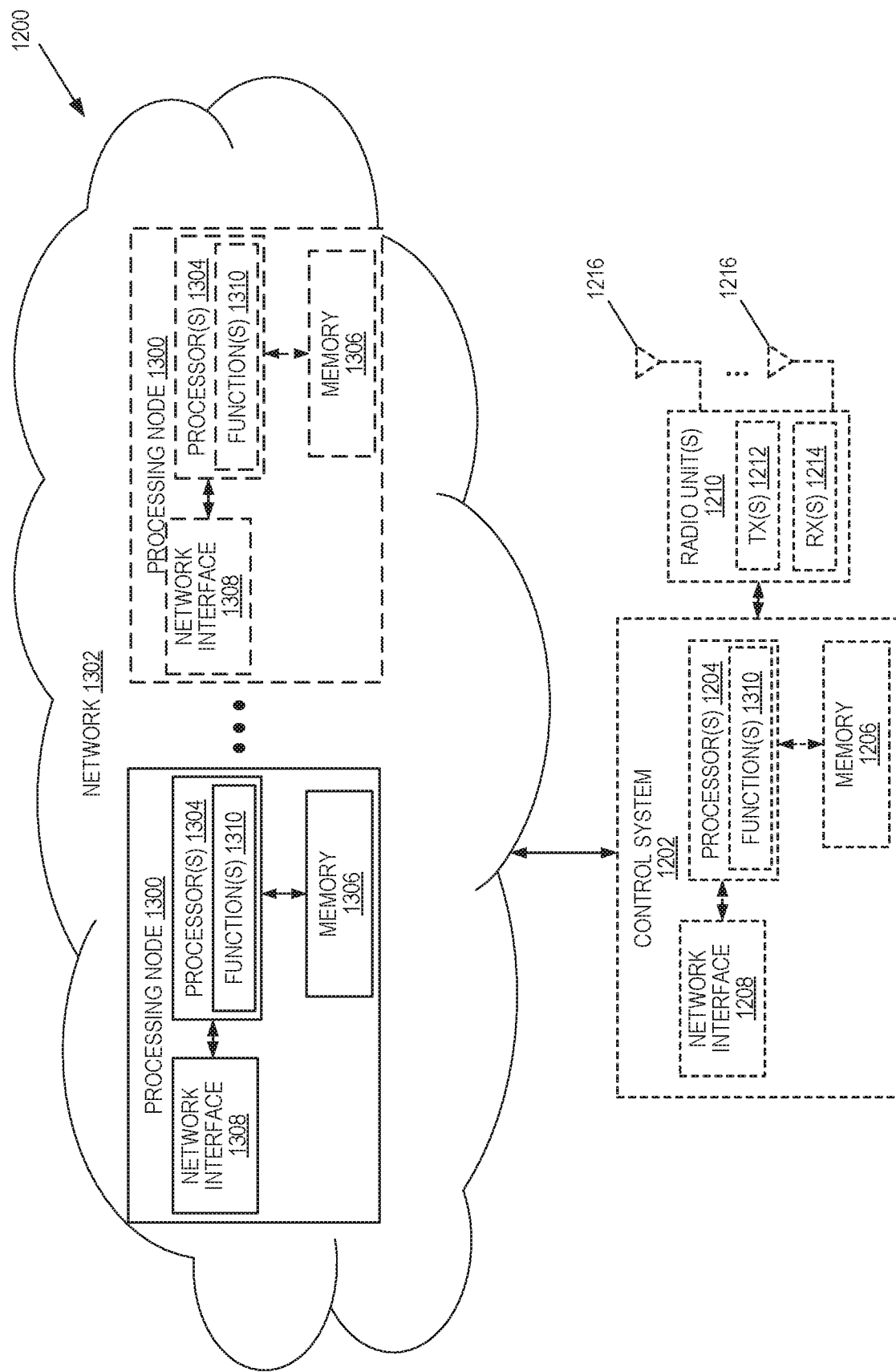
FIG. 13 is a schematic block diagram that illustrates a virtualized embodiment of the radio access node according to some embodiments of the present disclosure.

FIG. 13 is a schematic block diagram that illustrates a virtualized embodiment of the radio access node 1200 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node (s) in a network(s)). As illustrated, in this example, the radio access node 1200 may include the control system 1202 and/or the one or more radio units 1210, as described above. The control system 1202 may be connected to the radio unit(s) 1210 via, for example, an optical cable or the like. The radio access node 1200 includes one or more processing nodes 1300 coupled to or included as part of a network(s) 1302. If present, the control system 1202 or the radio unit(s) are connected to the processing node(s) 1300 via the network 1302. Each processing node 1300 includes one or more processors 1304 (e.g., CPUs, ASICs, FPGAS, and/or the like), memory 1306, and a network interface 1308.

In this example, functions 1310 of the radio access node 1200 described herein are implemented at the one or more processing nodes 1300 or distributed across the one or more processing nodes 1300 and the control system 1202 and/or the radio unit(s) 1210 in any desired manner. In some particular embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of radio access node 1200 or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
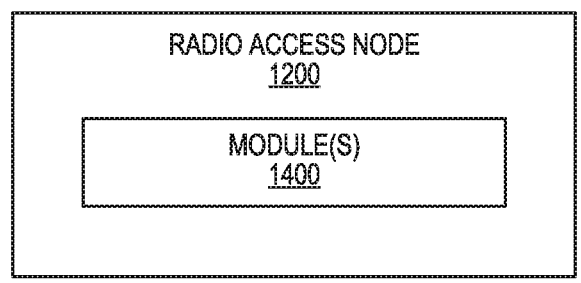
FIG. 14 is a schematic block diagram of the radio access node according to some other embodiments of the present disclosure.

FIG. 14 is a schematic block diagram of the radio access node 1200 according to some other embodiments of the present disclosure. The radio access node 1200 includes one or more modules 1400, each of which is implemented in software. The module(s) 1400 provide the functionality of the radio access node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
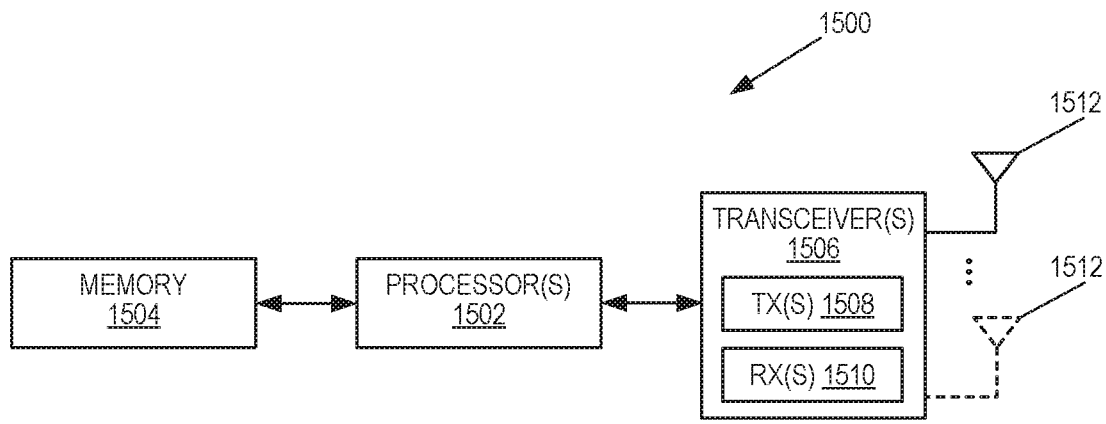
FIG. 15 is a schematic block diagram of a wireless communication device 1500 according to some embodiments of the present disclosure.

FIG. 15 is a schematic block diagram of a wireless communication device 1500 according to some embodiments of the present disclosure. As illustrated, the wireless communication device 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the wireless communication device 1500 described above may be fully or partially implemented in software that is, e.g., stored in the memory 1504 and executed by the processor(s) 1502. Note that the wireless communication device 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the wireless communication device 1500 and/or allowing output of information from the wireless communication device 1500), a power supply (e.g., a battery and associated power circuitry), etc.

In some embodiments, a computer program including instructions which, when executed by at least one processor, causes the at least one processor to carry out the functionality of the wireless communication device 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
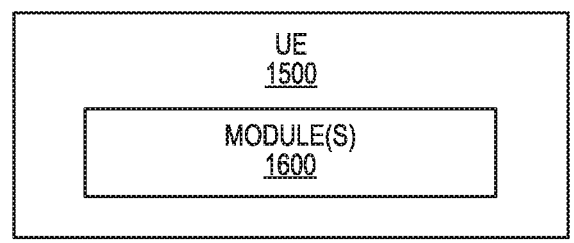
FIG. 16 is a schematic block diagram of the wireless communication device according to some other embodiments of the present disclosure.

FIG. 16 is a schematic block diagram of the wireless communication device 1500 according to some other embodiments of the present disclosure. The wireless communication device 1500 includes one or more modules 1600, each of which is implemented in software. The module(s) 1600 provide the functionality of the wireless communication device 1500 described herein.

Figure 17:
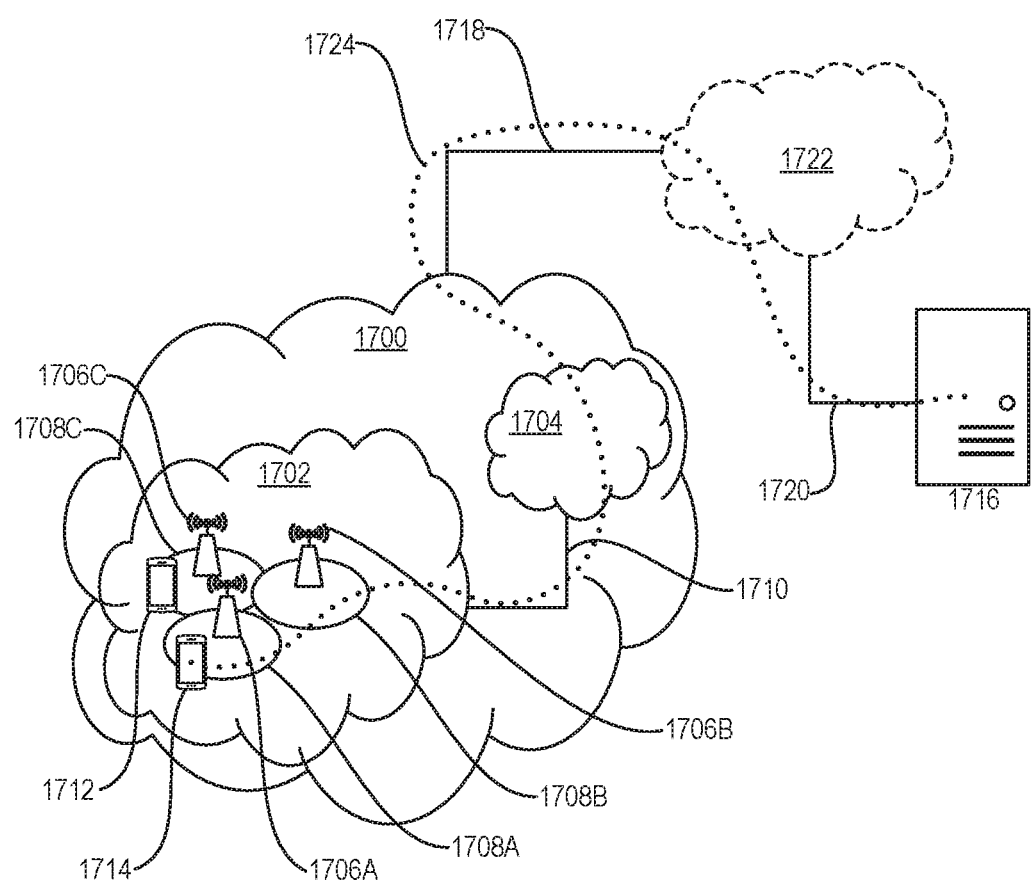
FIG. 17 illustrates a communication system includes a telecommunication network, such as a 3GPP-type cellular network, which comprises an access network, such as a RAN, and a core network according to some other embodiments of the present disclosure.

With reference to FIG. 17, in accordance with an embodiment, a communication system includes a telecommunication network 1700, such as a 3GPP-type cellular network, which comprises an access network 1702, such as a RAN, and a core network 1704. The access network 1702 comprises a plurality of base stations 1706A, 1706B, 1706C, such as Node Bs, eNBs, gNBs, or other types of wireless Access Points (APs), each defining a corresponding coverage area 1708A, 1708B, 1708C. Each base station 1706A, 1706B, 1706C is connectable to the core network 1704 over a wired or wireless connection 1710. A first UE 1712 located in coverage area 1708C is configured to wirelessly connect to, or be paged by, the corresponding base station 1706C. A second UE 1714 in coverage area 1708A is wirelessly connectable to the corresponding base station 1706A. While a plurality of UEs 1712, 1714 are illustrated in this example, the disclosed embodiments are equally applicable to a situation where a sole UE is in the coverage area or where a sole UE is connecting to the corresponding base station 1706.

The telecommunication network 1700 is itself connected to a host computer 1716, which may be embodied in the hardware and/or software of a standalone server, a cloud-implemented server, a distributed server, or as processing resources in a server farm. The host computer 1716 may be under the ownership or control of a service provider, or may be operated by the service provider or on behalf of the service provider. Connections 1718 and 1720 between the telecommunication network 1700 and the host computer 1716 may extend directly from the core network 1704 to the host computer 1716 or may go via an optional intermediate network 1722. The intermediate network 1722 may be one of, or a combination of more than one of, a public, private, or hosted network; the intermediate network 1722, if any, may be a backbone network or the Internet; in particular, the intermediate network 1722 may comprise two or more sub-networks (not shown).

The communication system of FIG. 17 as a whole enables connectivity between the connected UEs 1712, 1714 and the host computer 1716. The connectivity may be described as an Over-the-Top (OTT) connection 1724. The host computer 1716 and the connected UEs 1712, 1714 are configured to communicate data and/or signaling via the OTT connection 1724, using the access network 1702, the core network 1704, any intermediate network 1722, and possible further infrastructure (not shown) as intermediaries. The OTT connection 1724 may be transparent in the sense that the participating communication devices through which the OTT connection 1724 passes are unaware of routing of uplink and downlink communications. For example, the base station 1706 may not or need not be informed about the past routing of an incoming downlink communication with data originating from the host computer 1716 to be forwarded (e.g., handed over) to a connected UE 1712. Similarly, the base station 1706 need not be aware of the future routing of an outgoing uplink communication originating from the UE 1712 towards the host computer 1716.

Example implementations, in accordance with an embodiment, of the UE, base station, and host computer discussed in the preceding paragraphs will now be described with reference to FIG. 18. In a communication system 1800, a host computer 1802 comprises hardware 1804 including a communication interface 1806 configured to set up and maintain a wired or wireless connection with an interface of a different communication device of the communication system 1800. The host computer 1802 further comprises processing circuitry 1808, which may have storage and/or processing capabilities. In particular, the processing circuitry 1808 may comprise one or more programmable processors, ASICs, FPGAs, or combinations of these (not shown) adapted to execute instructions. The host computer 1802 further comprises software 1810, which is stored in or accessible by the host computer 1802 and executable by the processing circuitry 1808. The software 1810 includes a host application 1812. The host application 1812 may be operable to provide a service to a remote user, such as a UE 1814 connecting via an OTT connection 1816 terminating at the UE 1814 and the host computer 1802. In providing the service to the remote user, the host application 1812 may provide user data which is transmitted using the OTT connection 1816.

The communication system 1800 further includes a base station 1818 provided in a telecommunication system and comprising hardware 1820 enabling it to communicate with the host computer 1802 and with the UE 1814. The hardware 1820 may include a communication interface 1822 for setting up and maintaining a wired or wireless connection with an interface of a different communication device of the communication system 1800, as well as a radio interface 1824 for setting up and maintaining at least a wireless connection 1826 with the UE 1814 located in a coverage area (not shown in FIG. 18) served by the base station 1818. The communication interface 1822 may be configured to facilitate a connection 1828 to the host computer 1802. The connection 1828 may be direct or it may pass through a core network (not shown in FIG. 18) of the telecommunication system and/or through one or more intermediate networks outside the telecommunication system. In the embodiment shown, the hardware 1820 of the base station 1818 further includes processing circuitry 1830, which may comprise one or more programmable processors, ASICs, FPGAS, or combinations of these (not shown) adapted to execute instructions. The base station 1818 further has software 1832 stored internally or accessible via an external connection.

The communication system 1800 further includes the UE 1814 already referred to. The UE's 1814 hardware 1834 may include a radio interface 1836 configured to set up and maintain a wireless connection 1826 with a base station serving a coverage area in which the UE 1814 is currently located. The hardware 1834 of the UE 1814 further includes processing circuitry 1838, which may comprise one or more programmable processors, ASICs, FPGAs, or combinations of these (not shown) adapted to execute instructions. The UE 1814 further comprises software 1840, which is stored in or accessible by the UE 1814 and executable by the processing circuitry 1838. The software 1840 includes a client application 1842. The client application 1842 may be operable to provide a service to a human or non-human user via the UE 1814, with the support of the host computer 1802. In the host computer 1802, the executing host application 1812 may communicate with the executing client application 1842 via the OTT connection 1816 terminating at the UE 1814 and the host computer 1802. In providing the service to the user, the client application 1842 may receive request data from the host application 1812 and provide user data in response to the request data. The OTT connection 1816 may transfer both the request data and the user data. The client application 1842 may interact with the user to generate the user data that it provides.

Figure 18:
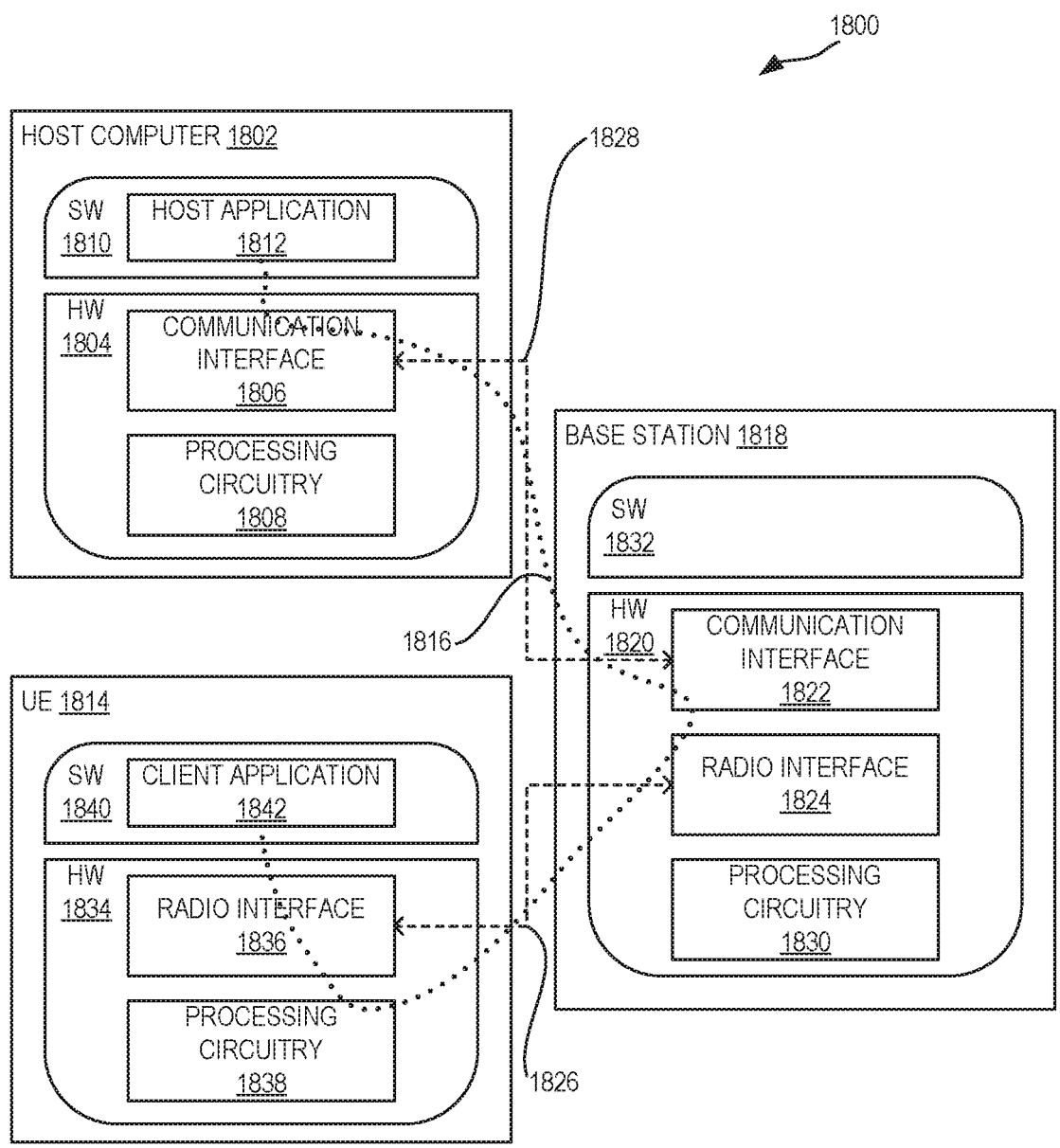
FIG. 18 illustrates a communication system, a host computer comprises hardware including a communication interface configured to set up and maintain a wired or wireless connection with an interface of a different communication device of the communication system according to some other embodiments of the present disclosure.

It is noted that the host computer 1802, the base station 1818, and the UE 1814 illustrated in FIG. 18 may be similar or identical to the host computer 1716, one of the base stations 1706A, 1706B, 1706C, and one of the UEs 1712, 1714 of FIG. 17, respectively. This is to say, the inner workings of these entities may be as shown in FIG. 18 and independently, the surrounding network topology may be that of FIG. 17.

In FIG. 18, the OTT connection 1816 has been drawn abstractly to illustrate the communication between the host computer 1802 and the UE 1814 via the base station 1818 without explicit reference to any intermediary devices and the precise routing of messages via these devices. The network infrastructure may determine the routing, which may be configured to hide from the UE 1814 or from the service provider operating the host computer 1802, or both. While the OTT connection 1816 is active, the network infrastructure may further take decisions by which it dynamically changes the routing (e.g., on the basis of load balancing consideration or reconfiguration of the network).

The wireless connection 1826 between the UE 1814 and the base station 1818 is in accordance with the teachings of the embodiments described throughout this disclosure. One or more of the various embodiments improve the performance of OTT services provided to the UE 1814 using the OTT connection 1816, in which the wireless connection 1826 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1816 between the host computer 1802 and the UE 1814, in response to variations in the measurement results. The measurement procedure and/or the network functionality for reconfiguring the OTT connection 1816 may be implemented in the software 1810 and the hardware 1804 of the host computer 1802 or in the software 1840 and the hardware 1834 of the UE 1814, or both. In some embodiments, sensors (not shown) may be deployed in or in association with communication devices through which the OTT connection 1816 passes; the sensors may participate in the measurement procedure by supplying values of the monitored quantities exemplified above, or supplying values of other physical quantities from which the software 1810, 1840 may compute or estimate the monitored quantities. The reconfiguring of the OTT connection 1816 may include message format, retransmission settings, preferred routing, etc.; the reconfiguring need not affect the base station 1818, and it may be unknown or imperceptible to the base station 1818. Such procedures and functionalities may be known and practiced in the art. In certain embodiments, measurements may involve proprietary UE signaling facilitating the host computer 1802's measurements of throughput, propagation times, latency, and the like. The measurements may be implemented in that the software 1810 and 1840 causes messages to be transmitted, in particular empty or 'dummy' messages, using the OTT connection 1816 while it monitors propagation times, errors, etc.

Figures 19, 20:
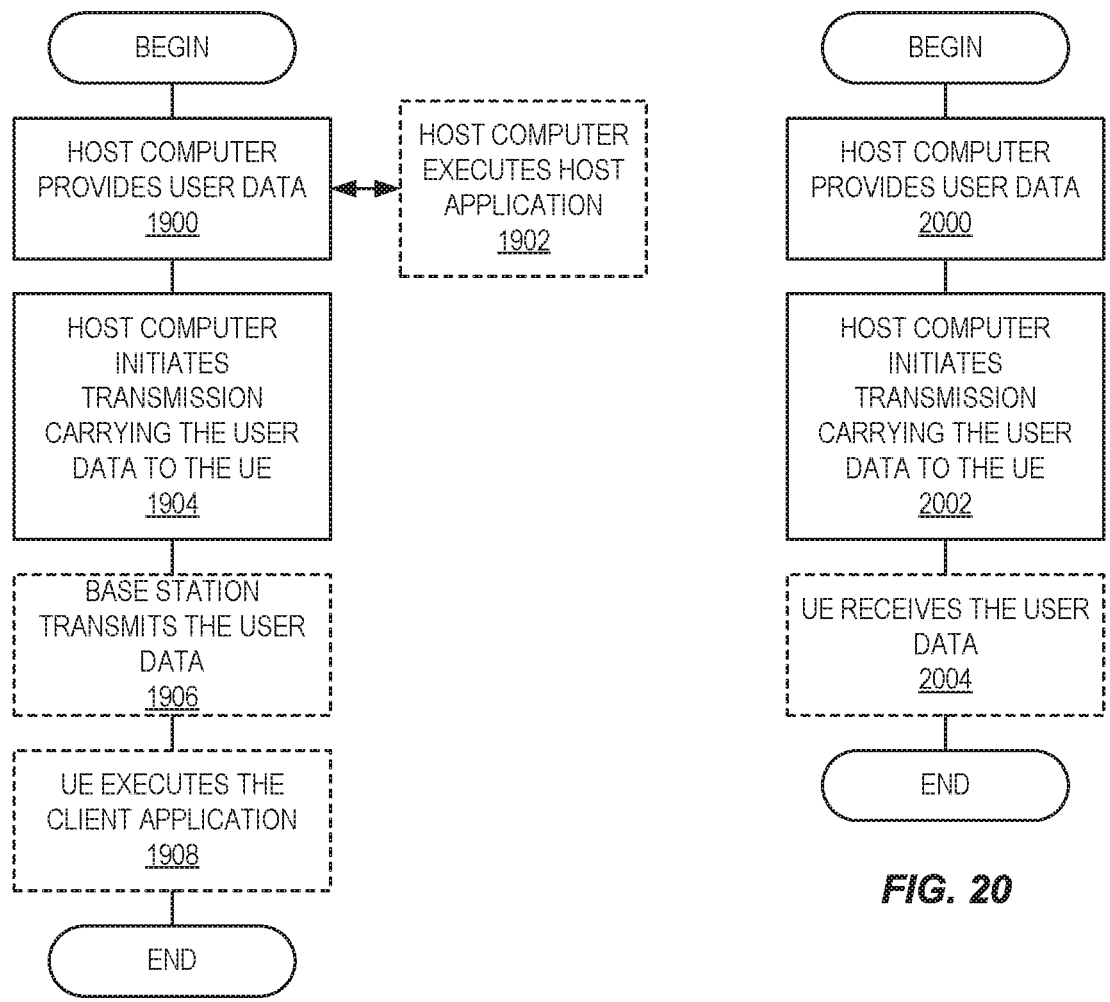
FIGS. 19 to 22 illustrate methods implemented in a communication system, according to some other embodiments of the present disclosure.

FIG. 19 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 19 will be included in this section. In step 1900, the host computer provides user data. In sub-step 1902 (which may be optional) of step 1900, the host computer provides the user data by executing a host application. In step 1904, the host computer initiates a transmission carrying the user data to the UE. In step 1906 (which may be optional), the base station transmits to the UE the user data which was carried in the transmission that the host computer initiated, in accordance with the teachings of the embodiments described throughout this disclosure. In step 1908 (which may also be optional), the UE executes a client application associated with the host application executed by the host computer.

FIG. 20 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 20 will be included in this section. In step 2000 of the method, the host computer provides user data. In an optional sub-step (not shown) the host computer provides the user data by executing a host application. In step 2002, the host computer initiates a transmission carrying the user data to the UE. The transmission may pass via the base station, in accordance with the teachings of the embodiments described throughout this disclosure. In step 2004 (which may be optional), the UE receives the user data carried in the transmission.

Figure 21:
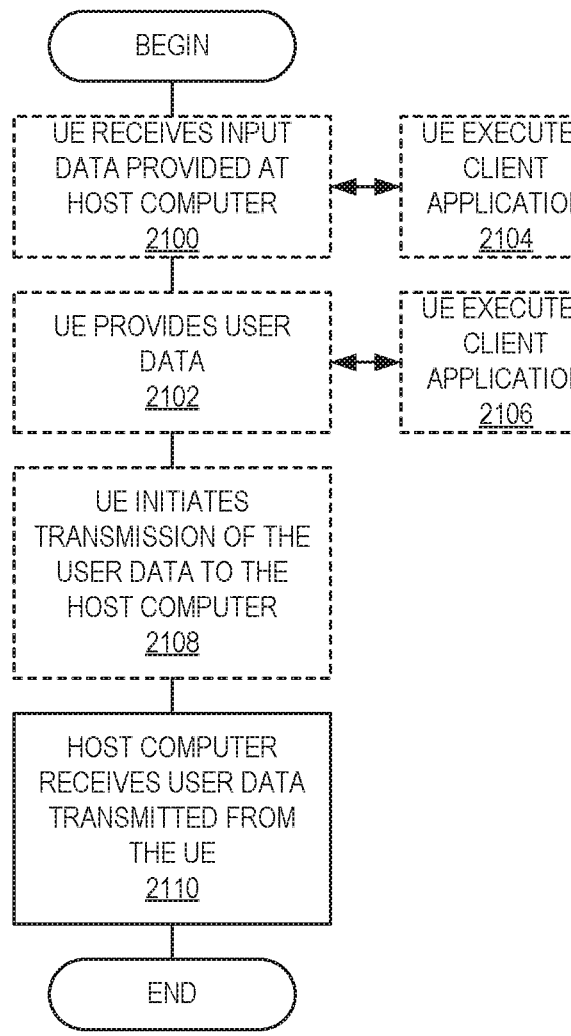

FIG. 21 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 21 will be included in this section. In step 2100 (which may be optional), the UE receives input data provided by the host computer. Additionally or alternatively, in step 2102, the UE provides user data. In sub-step 2104 (which may be optional) of step 2100, the UE provides the user data by executing a client application. In sub-step 2106 (which may be optional) of step 2102, the UE executes a client application which provides the user data in reaction to the received input data provided by the host computer. In providing the user data, the executed client application may further consider user input received from the user. Regardless of the specific manner in which the user data was provided, the UE initiates, in sub-step 2108 (which may be optional), transmission of the user data to the host computer. In step 2110 of the method, the host computer receives the user data transmitted from the UE, in accordance with the teachings of the embodiments described throughout this disclosure.

Figure 22:
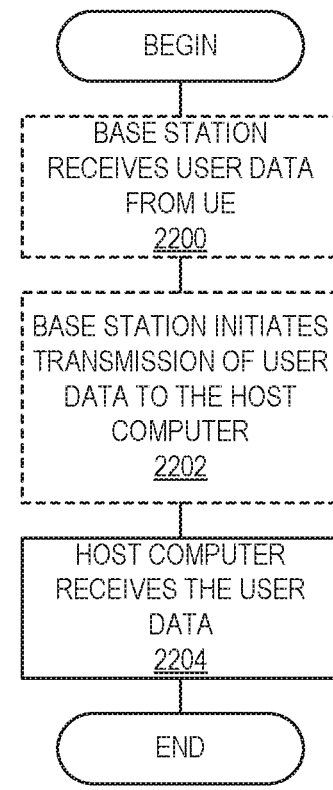

FIG. 22 is a flowchart illustrating a method implemented in a communication system, in accordance with one embodiment. The communication system includes a host computer, a base station, and a UE which may be those described with reference to FIGS. 17 and 18. For simplicity of the present disclosure, only drawing references to FIG. 22 will be included in this section. In step 2200 (which may be optional), in accordance with the teachings of the embodiments described throughout this disclosure, the base station receives user data from the UE. In step 2202 (which may be optional), the base station initiates transmission of the received user data to the host computer. In step 2204 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device to support Physical Uplink Shared Channel, PUSCH, multiple Transmission/Reception Point, multi-TRP, scheduling, the method comprising one or more of: obtaining (600) a configuration for Transmission Configuration Indicator, TCI, states for Uplink, UL, PUSCH scheduling; activating/deactivating (602) a subset of configured TCI States; if two TCI states are indicated, transmitting (604A) two different PUSCHs each corresponding to one of the indicated TCI states; if one TCI state is indicated, transmitting (604B) a single PUSCH corresponding to the indicated TCI state; mapping (606) of indicated TCI states to the transmission occasions or actual repetitions is preconfigured via higher layer parameter(s) or is given by a predefined rule; and/or applying (608) a Transmitted Precoding Matrix Indicator, TPMI, to transmission occasions or actual repetitions associated with each indicated TCI state based on a signaled value and/or a predefined value.

Embodiment 2: The method of embodiment 1 wherein obtaining the configuration for TCI states for UL PUSCH scheduling comprises receiving the configuration from a network node.

Embodiment 3: The method of any of embodiments 1 to 2 wherein activating/deactivating the subset of configured TCI States comprises transmitting a control message to the network node activating/deactivating the subset of configured TCI States.

Embodiment 4: The method of embodiment 3 wherein the control message is a Medium Access Control, MAC, Control Element, CE.

Embodiment 5: The method of embodiment 4 wherein the MAC CE activates a subset of configured TCI States and maps the activated TCI states to the codepoints of a bit field (e.g., TCI field) in UL DCI.

Embodiment 6: The method of any of embodiments 1 to 5 wherein transmitting the two different PUSCHs targets different TRPs.

Embodiment 7: The method of any of embodiments 1 to 6 wherein redundancy versions to be applied to each transmission occasion or actual repetition is either indicated by the $rv_{id}$ in UL DCI or by a combination of the indicated $rv_{id}$ in UL DCI and an UL TCI specific redundancy version offset.

Embodiment 8: The method of any of embodiments 1 to 7 wherein the UL TCI states are indicated in UL DCI.

Embodiment 9: The method of any of embodiments 1 to 8 wherein the signaled value is signaled via DCI.

Embodiment 10: The method of embodiment 9 wherein the signaled value indicates multiple TPMIs via a single precoder information field.

Embodiment 11: The method of any of embodiments 1 to 10 wherein the predefined value cycles through TPMIs in a UL codebook.

Embodiment 12: The method of any of the previous embodiments, further comprising: providing user data; and forwarding the user data to a host computer via the transmission to the base station.

Group B Embodiments

Embodiment 13: A method performed by a base station to support Physical Uplink Shared Channel, PUSCH, multiple Transmission/Reception Point, multi-TRP, scheduling, the method comprising one or more of: transmitting, to a wireless device, a configuration for Transmission Configuration Indicator, TCI, states for Uplink, UL, PUSCH scheduling; receiving, from the wireless device, activation/deactivation of a subset of configured TCI States; if two TCI states are indicated, receiving two different PUSCHs each corresponding to one of the indicated TCI states; if one TCI state is indicated, receiving a single PUSCH corresponding to the indicated TCI state; determining that the indicated TCI states are mapped to the transmission occasions or actual repetitions based on a preconfigured via higher layer parameter(s) or is given by a predefined rule; and/or receiving a transmission with a Transmitted Precoding Matrix Indicator, TPMI, applied to transmission occasions or actual repetitions associated with each indicated TCI state based on a signaled value and/or a predefined value.

Embodiment 14: The method of embodiment 13 wherein transmitting the configuration for TCI states for UL PUSCH scheduling comprises transmitting the configuration in a control message.

Embodiment 15: The method of any of embodiments 13 to 14 wherein receiving activation/deactivation of the subset of configured TCI States comprises receiving a control message to the network node activating/deactivating the subset of configured TCI States.

Embodiment 16: The method of embodiment 15 wherein the control message is a Medium Access Control, MAC, Control Element, CE.

Embodiment 17: The method of embodiment 16 wherein the MAC CE activates a subset of configured TCI States and maps the activated TCI states to the codepoints of a bit field (e.g., TCI field) in UL DCI.

Embodiment 18: The method of any of embodiments 13 to 17 wherein receiving the two different PUSCHs comprises receiving from different TRPs.

Embodiment 19: The method of any of embodiments 13 to 18 wherein redundancy versions to be applied to each transmission occasion or actual repetition is either indicated by the $rv_{id}$ in UL DCI or by a combination of the indicated $rv_{id}$ in UL DCI and an UL TCI specific redundancy version offset.

Embodiment 20: The method of any of embodiments 13 to 19 wherein the UL TCI states are indicated in UL DCI.

Embodiment 21: The method of any of embodiments 13 to 20 wherein the signaled value is signaled via DCI.

Embodiment 22: The method of embodiment 21 wherein the signaled value indicates multiple TPMIs via a single precoder information field.

Embodiment 23: The method of any of embodiments 13 to 22 wherein the predefined value cycles through TPMIs in a UL codebook.

Embodiment 24: The method of any of the previous embodiments, further comprising: obtaining user data; and forwarding the user data to a host computer or a wireless device.

Group C Embodiments

Embodiment 25: A wireless device to support Physical Uplink Shared Channel, PUSCH, multiple Transmission/Reception Point, multi-TRP, scheduling, the wireless device comprising: processing circuitry configured to perform any of the steps of any of the Group A embodiments; and power supply circuitry configured to supply power to the wireless device.

Embodiment 26: A base station to support Physical Uplink Shared Channel, PUSCH, multiple Transmission/Reception Point, multi-TRP, scheduling, the base station comprising: processing circuitry configured to perform any of the steps of any of the Group B embodiments; and power supply circuitry configured to supply power to the base station.

Embodiment 27: A User Equipment, UE, to support Physical Uplink Shared Channel, PUSCH, multiple Transmission/Reception Point, multi-TRP, scheduling, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 28: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 29: The communication system of the previous embodiment further including the base station.

Embodiment 30: The communication system of the previous 2 embodiments, further including the UE, wherein the UE is configured to communicate with the base station.

Embodiment 31: The communication system of the previous 3 embodiments, wherein: the processing circuitry of the host computer is configured to execute a host application, thereby providing the user data; and the UE comprises processing circuitry configured to execute a client application associated with the host application.

Embodiment 32: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 33: The method of the previous embodiment, further comprising, at the base station, transmitting the user data.

Embodiment 34: The method of the previous 2 embodiments, wherein the user data is provided at the host computer by executing a host application, the method further comprising, at the UE, executing a client application associated with the host application.

Embodiment 35: A User Equipment, UE, configured to communicate with a base station, the UE comprising a radio interface and processing circuitry configured to perform the method of the previous 3 embodiments.

Embodiment 36: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 37: The communication system of the previous embodiment, wherein the cellular network further includes a base station configured to communicate with the UE.

Embodiment 38: The communication system of the previous 2 embodiments, wherein: the processing circuitry of the host computer is configured to execute a host application, thereby providing the user data; and the UE's processing circuitry is configured to execute a client application associated with the host application.

Embodiment 39: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 40: The method of the previous embodiment, further comprising at the UE, receiving the user data from the base station.

Embodiment 41: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 42: The communication system of the previous embodiment, further including the UE.

Embodiment 43: The communication system of the previous 2 embodiments, further including the base station, wherein the base station comprises a radio interface configured to communicate with the UE and a communication interface configured to forward to the host computer the user data carried by a transmission from the UE to the base station.

Embodiment 44: The communication system of the previous 3 embodiments, wherein: the processing circuitry of the host computer is configured to execute a host application; and the UE's processing circuitry is configured to execute a client application associated with the host application, thereby providing the user data.

Embodiment 45: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 46: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 47: The method of the previous embodiment, further comprising, at the UE, providing the user data to the base station.

Embodiment 48: The method of the previous 2 embodiments, further comprising: at the UE, executing a client application, thereby providing the user data to be transmitted; and at the host computer, executing a host application associated with the client application.

Embodiment 49: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 50: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 51: The communication system of the previous embodiment further including the base station.

Embodiment 52: The communication system of the previous 2 embodiments, further including the UE, wherein the UE is configured to communicate with the base station.

Embodiment 53: The communication system of the previous 3 embodiments, wherein: the processing circuitry of the host computer is configured to execute a host application; and the UE is configured to execute a client application associated with the host application, thereby providing the user data to be received by the host computer.

Embodiment 54: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 55: The method of the previous embodiment, further comprising at the base station, receiving the user data from the UE.

Embodiment 56: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CE Control Element
CG Configured Grant
CORESET Control Resource Set CP-OFDM Cyclic Prefix Orthogonal Frequency Division Multiplexing
CPU Central Processing Unit
CSI-RS Channel State Information Reference Signal
DCI Downlink Control Information
DFT Discrete Fourier Transform
DL Downlink
DMRS Demodulation Reference Signal
DN Data Network
DSP Digital Signal Processor
eMBB enhanced Mobile Broadband
eNB Enhanced or Evolved Node B
FPGA Field Programmable Gate Array
FR Frequency Range
gNB New Radio Base Station
gNB-CU New Radio Base Station Central Unit
gNB-DU New Radio Base Station Distributed Unit
HSS Home Subscriber Server
IoT Internet of Things
IP Internet Protocol
LTE Long Term Evolution
MAC Medium Access Control.
MIMO Multiple Input Multiple Output
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
PDCCH Physical Downlink Control Channel
PDSCH Physical Downlink Shared Channel
P-GW Packet Data Network Gateway
PUCCH Physical Uplink Control Channel
PUSCH Physical Uplink Shared Channel
QCL Quasi Co-Located
QoS Quality of Service
RAM Random Access Memory
RAN Radio Access Network
RB Resource Block
RE Resource Element
ROM Read Only Memory
RRC Radio Resource Control
RRH Remote Radio Head
RS Reference Signal
RTT Round Trip Time
RV Redundancy Version
SCEF Service Capability Exposure Function
SMF Session Management Function
SRI Service Request Indicator
SRS Sounding Reference Signal
SSB Synchronization Signal Block
TB Transport Block
TCI Transmission Configuration Indicator
TDD Time Division Duplexing
TDRA Time-Domain Resource Allocation
TPMI Transmitted Precoding Matrix Indicator
TRP Transmission/Reception Point
UDM Unified Data Management
UE User Equipment
UL Uplink
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless device to support Physical Uplink Shared Channel (PUSCH) multiple Transmission/Reception Point (multi-TRP) transmission, the method comprising:
receiving a configuration of Transmission Configuration Indicator (TCI) states for Uplink (UL) PUSCH transmission, wherein the configuration is received via radio resource control (RRC) signaling;
receiving a downlink control information (DCI) message comprising a bit field, wherein a mapping applies between code points of the bit field and configured TCI states such that:
a first code point of the bit field is mapped to two TCI states targeting a first TRP and a second TRP respectively;
a second code point of the bit field is mapped to a TCI state targeting the first TRP; and
a third code point of the bit field is mapped to a TCI state targeting the second TRP;
when the DCI message comprises the first code point in the bit field, transmitting a plurality of PUSCH transmission occasions, where a first subset of the PUSCH transmission occasions is associated with one of said two TCI states, and where a second subset of the PUSCH transmission occasions is associated with the other TCI state of said two TCI states;
when the DCI message comprises the second code point in the bit field, transmitting the plurality of PUSCH transmission occasions, where all of the PUSCH transmission occasions are associated with said TCI state targeting the first TRP; and
when the DCI message comprises the third code point in the bit field, transmitting the plurality of PUSCH transmission occasions, where all of the PUSCH transmission occasions are associated with said TCI state targeting the second TRP.

2. The method of claim 1, wherein the first code point of the bit field in the DCI message indicates that one of said two TCI states is to be used for the first subset of the PUSCH transmission occasions and that the other TCI state of said two TCI states is to be used for the second subset of the PUSCH transmission occasions.

3. The method of claim 2, further comprising:
receiving a Medium Access Control (MAC) Control Element (CE) that activates a subset of the configured TCI states; and
wherein said mapping applies between code points of the bit field and activated TCI states.

4. The method of claim 3, wherein the MAC CE also activates a subset of TCI states configured for downlink.

5. The method of claim 4, wherein the configured TCI states for UL PUSCH are common TCI states for both UL PUSCH and downlink, and wherein the MAC CE activates the same TCI states for UL PUSCH and for downlink.

6. The method of claim 4, wherein the MAC CE separately indicates the active TCI states for UL PUSCH and the active TCI states for downlink.

7. The method of claim 1, wherein the configured TCI states for UL PUSCH are common TCI states for both UL and downlink.

8. The method of claim 1, wherein the configured TCI states for UL PUSCH are separately configured from TCI states for downlink.

9. A method performed by a base station to support Physical Uplink Shared Channel (PUSCH) multiple Transmission/Reception Point (multi-TRP) transmission, the method comprising:
- transmitting, to a wireless device, a configuration of Transmission Configuration Indicator (TCI) states for Uplink (UL) PUSCH transmission, wherein the configuration is transmitted via radio resource control (RRC) signaling;
- transmitting, to the wireless device, a downlink control information (DCI) message comprising a bit field, wherein a mapping applies between code points of the bit field and configured TCI states such that:
  - a first code point of the bit field is mapped to two TCI states targeting a first TRP and a second TRP respectively;
  - a second code point of the bit field is mapped to a TCI state targeting the first TRP; and
  - a third code point of the bit field is mapped to a TCI state targeting the second TRP;
- when the DCI message comprises the first code point in the bit field, receiving a plurality of PUSCH transmission occasions, where a first subset of the PUSCH transmission occasions is associated with one of said two TCI states, and where a second subset of the PUSCH transmission occasions is associated with the other TCI state of said two TCI states;
- when the DCI message comprises the second code point in the bit field, receiving the plurality of PUSCH transmission occasions, where all of the PUSCH transmission occasions are associated with said TCI state targeting the first TRP; and
- when the DCI message comprises the third code point in the bit field, receiving the plurality of PUSCH transmission occasions, where all of the PUSCH transmission occasions are associated with said TCI state targeting the second TRP.

10. The method of claim 9, wherein the first code point of the bit field in the DCI message indicates that one of said two TCI states is to be used for the first subset of the PUSCH transmission occasions and that the other TCI state of said two TCI states is to be used for the second subset of the PUSCH transmission occasions.

11. A wireless device to support Physical Uplink Shared Channel (PUSCH) multiple Transmission/Reception Point (multi-TRP) transmission, the wireless device comprising:
- one or more transmitters;
- one or more receivers; and
- processing circuitry associated with the one or more transmitters and the one or more receivers, the processing circuitry configured to cause the wireless device to:
  - receive a configuration of Transmission Configuration Indicator (TCI) states for Uplink (UL) PUSCH transmission, wherein the configuration is received via radio resource control (RRC) signaling;
  - receive a downlink control information (DCI) message comprising a bit field, wherein a mapping applies between code points of the bit field and configured TCI states such that:
    - a first code point of the bit field is mapped to two TCI states targeting a first TRP and a second TRP respectively;
    - a second code point of the bit field is mapped to a TCI state targeting the first TRP; and
    - a third code point of the bit field is mapped to a TCI state targeting the second TRP;
  - when the DCI message comprises the first code point in the bit field, transmit a plurality of PUSCH transmission occasions, where a first subset of the PUSCH transmission occasions is associated with one of said two TCI states, and where a second subset of the PUSCH transmission occasions is associated with the other TCI state of said two TCI states;
  - when the DCI message comprises the second code point in the bit field, transmitting the plurality of PUSCH transmission occasions, where all of the PUSCH transmission occasions are associated with said TCI state targeting the first TRP; and
  - when the DCI message comprises the third code point in the bit field, transmitting the plurality of PUSCH transmission occasions, where all of the PUSCH transmission occasions are associated with said TCI state targeting the second TRP.

12. A base station to support Physical Uplink Shared Channel (PUSCH) multiple Transmission/Reception Point (multi-TRP) transmission, the base station comprising:
- one or more transmitters;
- one or more receivers; and
- processing circuitry associated with the one or more transmitters and the one or more receivers, the processing circuitry configured to cause the base station to:
  - transmit, to a wireless device, a configuration of Transmission Configuration Indicator (TCI) states for Uplink (UL) PUSCH transmission, wherein the configuration is transmitted via radio resource control (RRC) signaling;
  - transmit, to the wireless device, a downlink control information (DCI) message comprising a bit field, wherein a mapping applies between code points of the bit field and configured TCI states such that:
    - a first code point of the bit field is mapped to two TCI states targeting a first TRP and a second TRP respectively;
    - a second code point of the bit field is mapped to a TCI state targeting the first TRP; and
    - a third code point of the bit field is mapped to a TCI state targeting the second TRP;
  - when the DCI message comprises the first code point in the bit field, receive a plurality of PUSCH transmission occasions, where a first subset of the PUSCH transmission occasions is associated with one of said two TCI states, and where a second subset of the PUSCH transmission occasions is associated with the other TCI state of said two TCI states;
  - when the DCI message comprises the second code point in the bit field, receiving the plurality of PUSCH transmission occasions, where all of the PUSCH transmission occasions are associated with said TCI state targeting the first TRP; and
  - when the DCI message comprises the third code point in the bit field, receiving the plurality of PUSCH transmission occasions, where all of the PUSCH transmission occasions are associated with said TCI state targeting the second TRP.

* * * * *